(12) United States Patent
Dworman et al.

(10) Patent No.: US 11,216,102 B2
(45) Date of Patent: Jan. 4, 2022

(54) INTERACTIVE DISPLAY SURFACES

(71) Applicant: Touchwood Labs, Inc., Pittsburgh, PA (US)

(72) Inventors: Matthew Dworman, East Kingston, NH (US); Gaurav Asthana, Brooklyn, NY (US); Charles Hart, Pittsburgh, PA (US)

(73) Assignee: Touchwood Labs, Inc., Pittsburgh, PA (US)

( * ) Notice: Subject to any disclaimer, the term of this patent is extended or adjusted under 35 U.S.C. 154(b) by 0 days.

(21) Appl. No.: 17/169,192

(22) Filed: Feb. 5, 2021

(65) Prior Publication Data

US 2021/0240290 A1 Aug. 5, 2021

Related U.S. Application Data

(60) Provisional application No. 62/970,255, filed on Feb. 5, 2020.

(51) Int. Cl.
*G06F 3/041* (2006.01)
*A47B 97/00* (2006.01)
*G06F 3/044* (2006.01)

(52) U.S. Cl.
CPC ............ *G06F 3/0412* (2013.01); *A47B 97/00* (2013.01); *G06F 3/0446* (2019.05); *A47B 2220/0091* (2013.01)

(58) Field of Classification Search
CPC ..... G06F 3/0412; G06F 3/0446; A47B 97/00; A47B 2220/0091
See application file for complete search history.

(56) References Cited

U.S. PATENT DOCUMENTS

| | | |
|---|---|---|
| 2017/0010746 A1 | 1/2017 | Hotelling et al. |
| 2017/0345323 A1 | 11/2017 | Collins et al. |
| 2019/0135199 A1 | 5/2019 | Erler et al. |
| 2019/0212843 A1 | 7/2019 | He et al. |
| 2020/0241675 A1 | 7/2020 | Oki et al. |

FOREIGN PATENT DOCUMENTS

WO 2018029442 A1 2/2018

*Primary Examiner* — Peter D McLoone
(74) *Attorney, Agent, or Firm* — Dentons Cohen & Grigsby P.C.

(57) ABSTRACT

Touch responsive displays that may be integrated into a wide variety of non-transparent, non-glass surfaces to provide on-demand human computer interfaces that blend with the environment, i.e., remain invisible unless activated, effectively adding digital user interfaces (UI) to non-technology products and surfaces. The interactive display devices are frameless assemblies of a sensor layer, a light layer, and a support layer housing a microcontroller, wherein the device is configured to be positioned beneath a non-transparent surface layer with the sensor layer arranged below the surface layer.

19 Claims, 18 Drawing Sheets

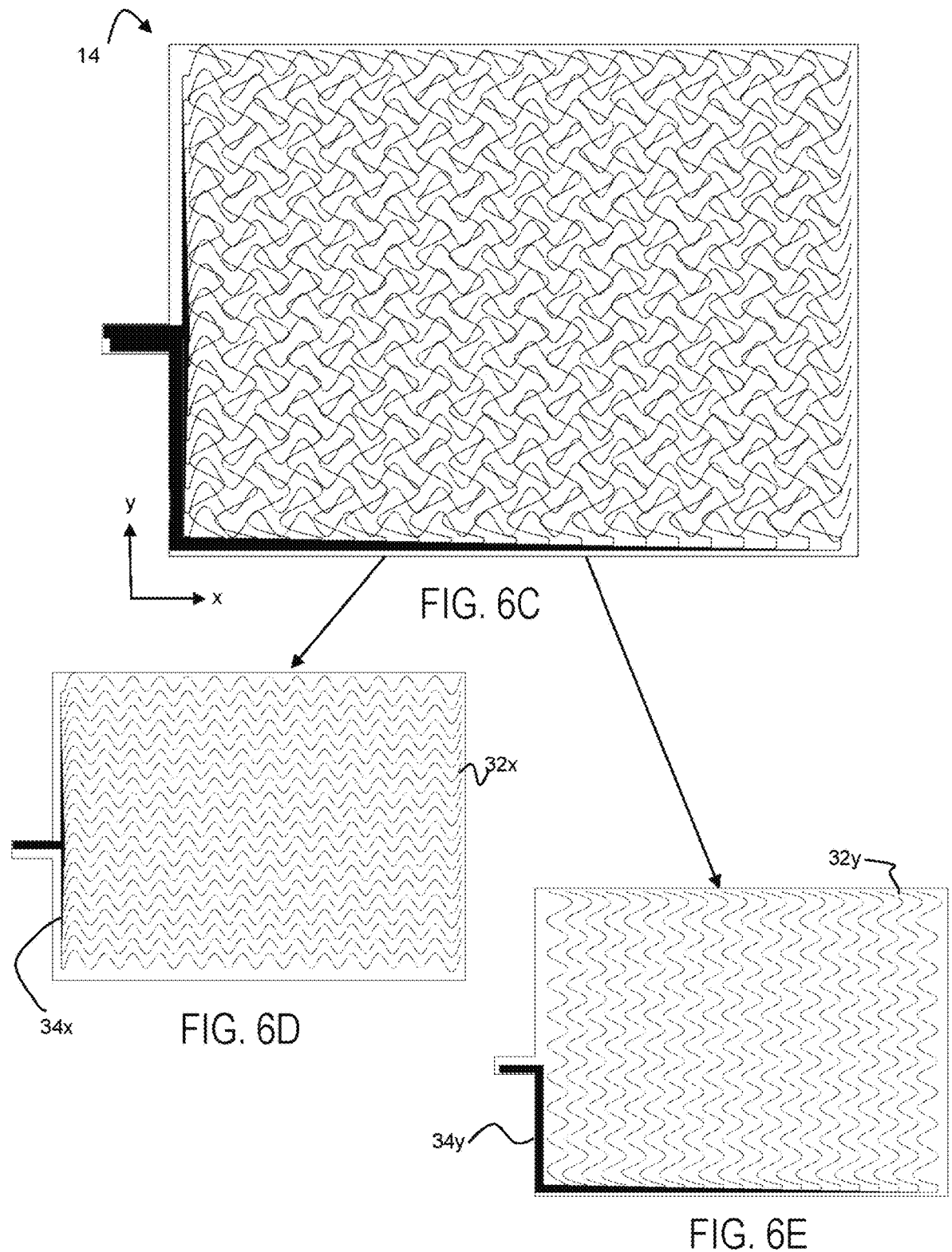

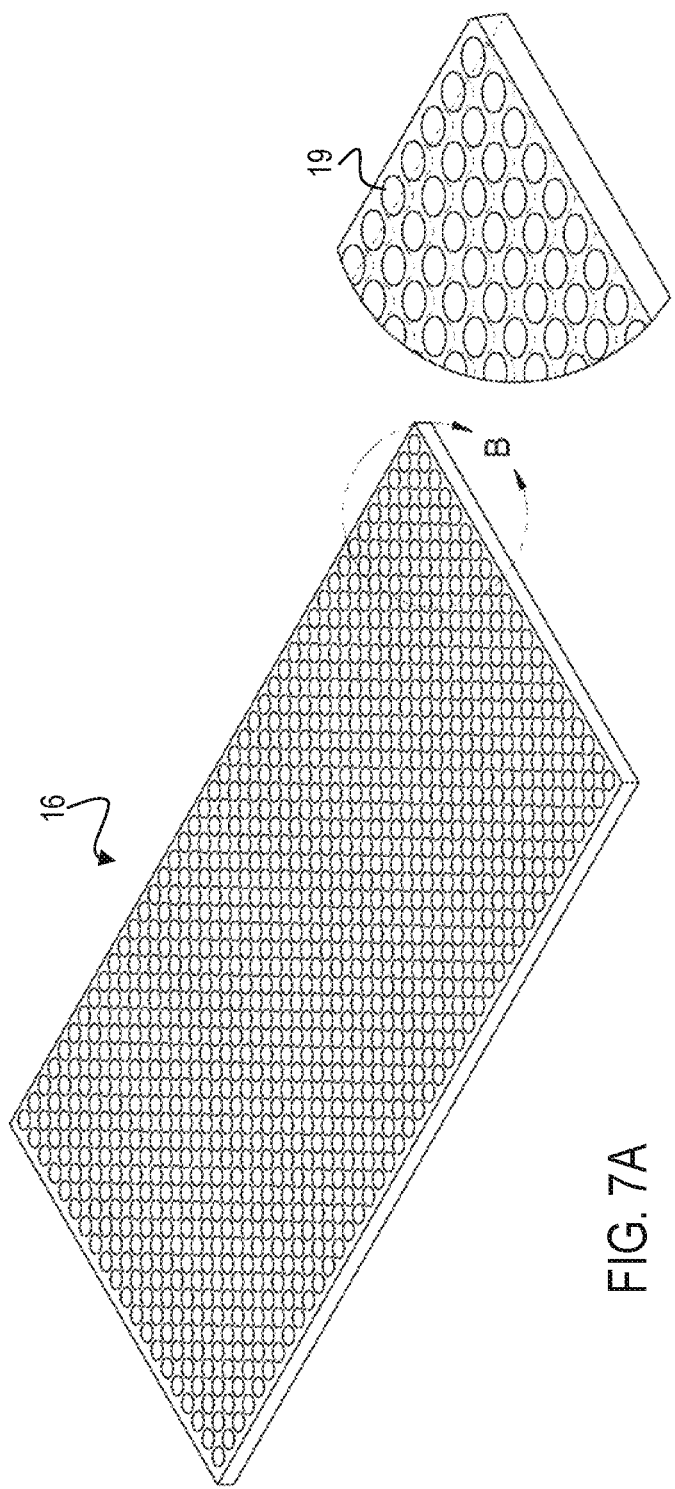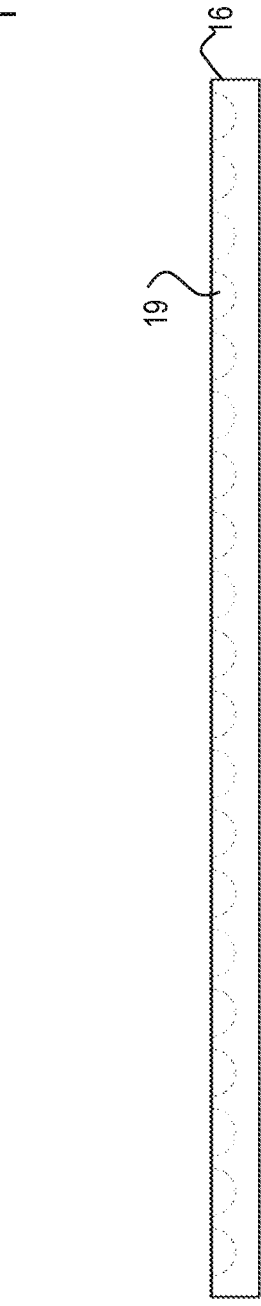
FIG. 7B
FIG. 7A
FIG. 7C here

INTERACTIVE DISPLAY SURFACES

CROSS-REFERENCE TO RELATED APPLICATIONS

The present application claims the benefit of priority under 35 U.S.C. § 119(e) of prior U.S. Provisional Application Ser. No. 62/970,255, filed Feb. 5, 2020, the entire content of which is incorporated herein.

FIELD OF THE INVENTION

The present invention is directed to interactive display surfaces, and more specifically to non-transparent surfaces having touch sensing and display capabilities.

DESCRIPTION OF THE RELATED ART

Touch screen technology provides a human computer interface that enables the user to provide input to and receive output from a processing unit. In recent years, touch screens, which are also referred to as touch panels, touch-enabled computer displays, touch-enabled computer screens, touch-screens, touch displays, touch pads, etc. (hereinafter collectively referred to as "touch screen(s)"), are being incorporated into numerous electronic devices including mobile phones, tablets, computers, and laptops. This widespread use is attributable, in part, to the intuitive experience that touch screens provide as a result of their natural and unobtrusive integration into technology and our environments.

As touch screen technologies grow in their capabilities and uses, they are being incorporated into a greater number and range of devices and locations. The use of such technology is expected to grow not only in personal devices, but also in residential, commercial, health care, retail, and education fields and environments. The flood of information that is being channeled through these interactive devices, however, is often overwhelming and unsustainable, leading to disruptions of sleep, attention span, and a drop in productivity and social interaction. In response, there is an increasing desire to make touch screens blend seamlessly into their environment without sacrificing esthetic.

Most touch screen technologies require the screen, or surface of the device or surface into which they are incorporated, to be glass or another transparent material. There is a market demand for the creation of touch screen technology that can be incorporated into surfaces that are not glass. For example, WO 2019/082399 and WO 2019/083051 describe touch responsive display panels that are provided with a wood veneer surface. While providing for improved integration with the environment, such panels require a frame and multiple layers, e.g., several air gaps and a light guide, that significantly increase the overall dimensions of the panel and decrease the display area. Moreover, such panels are capable of only limited display quality and range, reducing the types of content that may be provided thereon.

There remains a need for improved display panels that may blend seamlessly with the environment and are capable of a full range of display capabilities. The present invention addresses this need.

SUMMARY OF THE INVENTION

The present disclosure provides an interactive display device having a frameless outer perimeter, a top surface, and a bottom surface, wherein the device comprises several layers including at least a sensor layer and a light layer comprising a plurality of light elements that extend to the outer perimeter of the interactive display device and are configured to render digital information. The device further comprises a support layer arranged beneath the light layer, the support layer providing rigidity to the device and forming the bottom surface of the device.

The device comprises a microcontroller that generally includes a processor configured to execute computer-executable instructions, a memory storing the computer-executable instructions, and a wireless transceiver circuit in communication with the processor, wherein the processor is configured to receive signals related to a touch position on the top surface of the device and generate responsive output signals corresponding to the digital information to be rendered by the light layer. Moreover, the wireless transceiver circuit may receive and transmit wireless communication signals via a wireless network comprising the digital information to be rendered by the light layer. The microcontroller may be positioned between the light layer and the support layer, such as in a recess on the support layer configured to accommodate the microcontroller.

The plurality of light elements of the light layer may be arranged in a grid and may be selected from the group consisting of LED, OLED, and fiber optic lighting. The plurality of light elements may be independently powered. Each of the plurality of light elements may be a red-green-blue light emitting diode (RGB LED) or a red-green-blue-white light emitting diode (RGBW LED).

The sensor layer may comprise a capacitive touch sensor configured to generate an input signal related to a touch position on the sensor layer, and an electronic input-output control system configured to receive the input signal and generate a responsive output signal receivable by the processor. The capacitive touch sensor may comprise a conductive material arranged on a surface of a substrate, and a plurality of electrodes electrically coupled to the conductive material and spaced apart at predetermined intervals. The conductive material may comprise metal nanowires or traces arranged in an x-y grid.

The device may further comprise a substantially transparent insulation layer arranged between the sensor and light layers. The insulation layer may comprise a lens positioned above each of the plurality of light elements, wherein the lenses are formed as recesses or protrusions in the insulation layer and focus or diffuse light from the light elements. The plurality of light elements may be arranged in a grid having a pitch of 1 mm to 5 mm, and a thickness of the insulation layer may be equal to or greater than 0.5× the pitch of the grid.

The device may further comprise a non-transparent surface layer, wherein the layers of the device are not visible beneath the non-transparent surface layer when the light layer is inactive, and when the light layer is active, such as responsive to a signal from the sensor layer, may show the digital information. The surface layer and sensor layer may be bonded together with a transparent bonding material. The non-transparent surface layer generally comprises a material selected from the group consisting of wood, fiber, stone, leather, Corian®, Quartz®, polymers, ceramics, alloys, vinyl, opaque acrylics, plastics, and composite materials.

The present disclosure also provides a piece of furniture having the interactive display device embedded on a surface thereof, wherein the sensor layer is arranged below and bonded to a non-transparent surface veneer of the piece of furniture such that the device blends with the surface when the light layer is inactive.

The present disclosure also provides a wall, floor, panel, or door having the interactive display device embedded therein, wherein the sensor layer is arranged below and bonded to a non-transparent surface constituting at least a portion of the wall, floor, panel, or door such that the device blends with the surface when the light layer is inactive, and when the light layer is active, such as responsive to a signal from the touch sensor layer, may show the digital information.

The present disclosure also provides a method for providing digital information on a non-transparent surface using any of the interactive display devices disclosed herein. The method generally comprises positioning a sensor layer of an interactive display device below the non-transparent surface, and providing the digital information responsive to a touch contact on the non-transparent surface at a position over the sensor layer of the device, wherein the processor of the microcontroller is configured to receive signals related to the position and generate responsive output signals corresponding to the digital information to be rendered on the light layer. The digital information may be any of an image, a text, a light, a pattern, or a combination thereof. The non-transparent surface may be part of a piece of furniture, a wall, a floor, a door, a motor vehicle, a transit vehicle, or a decorative element.

BRIEF DESCRIPTION OF THE DRAWINGS

A better understanding of the present invention will be had upon reference to the following detailed description when read in conjunction with the accompanying drawings, wherein like numerals represent like features in the various views. It is to be noted that features and components in these drawings, illustrating views of embodiments of the present invention, unless stated to be otherwise, are not necessarily drawn to scale.

FIGS. 6C-6E illustrate a capacitive touch sensor surface formed using nanowires positioned in an x-y grid pattern, wherein FIG. 6C illustrates the combined x-y grid of nanowires and FIGS. 6D and 6E show the nanowires positioned in the x and y axis, respectively.

FIGS. 7A-7C illustrate a light layer comprising lenses according to the present disclosure, wherein FIG. 7A provides a perspective view, FIG. 7B provides an enlargement of detail B shown in FIG. 7A, and FIG. 7C provides a side view of the light layer showing the lenses as depressions in the light layer;

DETAILED DESCRIPTION OF THE INVENTION

Figure 1A:
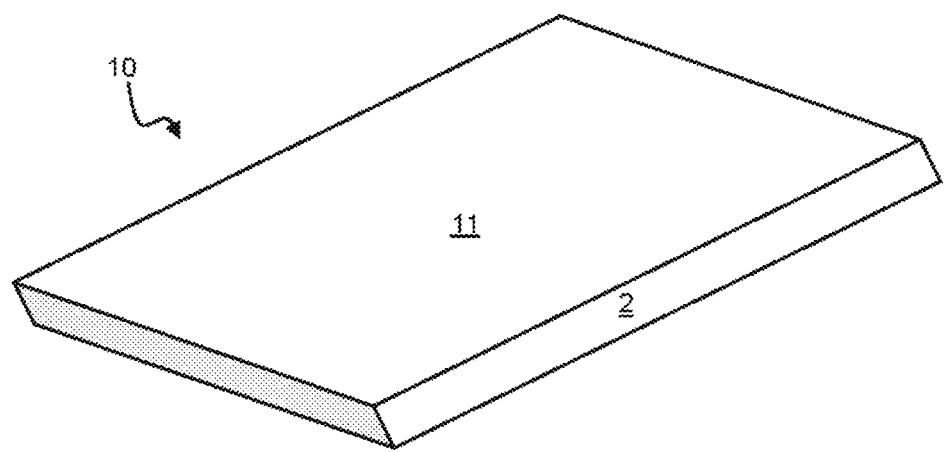
FIGS. 1A and 1B illustrate an interactive display device and exploded layers of the device, respectively, according to the present disclosure.

The present invention relates to devices and assemblies that provide interactive touch responsive surfaces and visible displays that may be incorporated into a wide range of substrates and objects having non-transparent surfaces, including walls, floors, doors, furniture, dashboards and other panels.

Prior to setting forth the aspects of the invention in greater detail, it may be helpful to an understanding thereof to set forth the following definitions of certain terms to be used hereinafter.

Definitions and Abbreviations

As used in the specification including the appended claims, the singular forms "a," "an," and "the" include the plural, and reference to a particular numerical value includes at least that particular value, unless the context clearly dictates otherwise.

The word "comprising" and forms of the word "comprising", as used in the specification including the appended claims, does not limit the present invention to exclude any variants or additions. Additionally, although the present invention has been described in terms of "comprising", the devices, assemblies, and methods detailed herein may also be described as consisting essentially of or consisting of. For example, while the invention has been described in terms of an assembly comprising multiple layers, an assembly consisting essentially of or consisting of the same layers is also within the present scope. In this context, "consisting essentially of" means that any additional layers in the assembly or steps in the methods will not materially affect the output produced by the assembly.

The use of "or" means "and/or" unless specifically stated otherwise.

As used herein, the term "substantially" may be taken to represent the inherent degree of uncertainty that may be attributed to any quantitative comparison, value, measurement, or other representation. Thus, the term substantially may mean an amount of generally at least about 80%, about 90%, about 95%, about 98%, or even about 99%. If referring to a level of non-transparency, for example, the term "substantially" may be referenced to an overall percentage of opacity.

Other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and appended claims are approximations that may vary depending upon at least the substrate used, the type and form of touch sensitive and display surfaces, and the size of the assembly or device comprising the assembly. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

"Including" and like terms means including, but not limited to. When ranges are given, any endpoints of those ranges and/or numbers within those ranges can be combined within the scope of the present invention.

As used herein, the term "digital information" may be understood to include any textual or graphical information that may be conveyed by a processor, such as a central processing unit (CPU) or graphical processing unit (GPU), and displayed by the light layer of the present invention.

As used herein, the term "internet of things" or "IoT" is a system of interrelated computing devices, mechanical and digital machines provided with unique identifiers and the ability to transfer data over a network without requiring human-to-human or human-to-computer interaction or the interconnection via the internet of embedded applications in devices that enables those devices to send and receive data from other devices.

As used herein, the term "nanowire" may be understood to mean a wire having a ratio of the length to width of greater than 1000. Typical nanowires of the present invention are 1-250 microns thick, such as about 25 microns thick.

The inventions detailed in this disclosure are not limited to the specific devices, methods, processes, elements or parameters described and/or shown herein and the terminology used herein is for the purpose of describing particular embodiments and is by way of example only and not intended to be limiting of the claimed invention. Any and all patents and other publications identified in this specification are incorporated by reference as though fully set forth herein.

In the following description, certain details are set forth in order to provide a better understanding of various embodiments of an interactive display surface. However, one skilled in the art will understand that these embodiments may be practiced without these details and/or in the absence of any details not described herein. In other instances, well-known structures, methods, and/or techniques associated with methods of practicing the various embodiments may not be shown or described in detail to avoid unnecessarily obscuring descriptions of other details of the various embodiments.

Overview of the Interactive Display Surface

The novel interactive display surfaces of the present disclosure provide users with access to pertinent information and/or internet connectivity in an unexpected way. While we are surrounded by traditional black, glass screens, the presently disclosed assemblies and surfaces receive inputs and provide information that is visible through a variety of non-transparent materials that blend seamlessly with the environment. When not in use, the touch screen-integrated object (table, counter, door, etc.) serves its normal function and the interactive surface is not visible. When the display is in use, such as by activation via touch input, the added functionality comes to life. Thus, the interactive display surfaces of the present disclosure provide user interfaces that are invisible, i.e., blend with the room or environment, effectively adding digital user interfaces (UI) to non-technology products and surfaces.

Existing touch screen displays, and surfaces have one thing in common—they all look like screens/displays. More specifically, when then are not powered on, they present a surface that is black or grey-looking glass or clear plastic slab. In addition, for touch screens currently on the market, the entireties of their screens are powered on (even the black areas) when they are activated. They do not provide for powering of selected areas or individual pixels of the screen. In comparison, the interactive display assemblies and surfaces of the present disclosure afford operation or activation of specific areas and even specific pixels that are displayed through the surface of substantially non-transparent materials. This ability allows the assemblies to be incorporated into a substantially non-transparent surface without transforming that surface into a traditional-looking touchscreen.

These display assemblies and surfaces can be embedded in furniture, such as tabletops, counters, doors, walls, and even ceilings. They can be used as a standalone IOT device to control thermostats, sound systems, or other household connectivity. Commercially, they can be used to provide information in transit systems (e.g., airports and airplanes, bus stations and buses, etc.), restaurants and bars, retail environments, offices and office buildings, among others, by configuring the display surfaces to show maps and directions, schedules, menus, specials, advertising, emergency information and alerts, etc.

Some non-limiting examples of types of surfaces that fall within the scope of the present invention include furniture and furnishing such as tables, desks, retail/commercial tables and displays; surfaces such as elevator doors and panels, walls, vehicle dashboards, vehicle interior and exterior surfaces, counter tops, work surfaces, gaming surfaces, electronic device cases, appliance doors and fronts, cabinet doors, residential and commercial interior and exterior doors, hanging panels, decorative surfaces, children's toys, coverings and panels for electrical switches, outlets, receptacles and the like, window treatments, blinds, and shades; public display and signage areas such as notice boards, maps, signage, vending machine display panels; and skins and exterior surfaces for robotic applications, industrial automation equipment and machinery.

There are a wide variety of surface materials that can be incorporated into an interactive display surface according to the present disclosure, including but not limited to natural materials such as wood, fiber, stone, and leather, as well as man-made materials such Corian®, quartz, polymers, ceramics, alloys, vinyl, opaque acrylics, other plastics and composites thereof. When not in use, an interactive display surface provides no indication that it is an electronic device, as the embedded layers are not visible, and only when used or activated does the light layer glow through the wood or other material to display digital information.

For example, an exemplary implementation of the present invention is a coffee table that allows users to interact with its built-in pixel display and touch sensing capabilities for fun, interactive games, and colorful, playful shape and sound interactions. As a bedside table, the display surface serves to enhance sleeping and waking with integrated sleep and wake functions such as clocks, lighting, sound. When integrated in a table, such as found in a restaurant (see 900" of FIG. 11B; 900a of FIG. 13A), the display surface may provide menu options, nutrition information, news of the day, interactive games for customers to play while waiting for their food or server, automated ordering from the table, etc. (see 904" of FIG. 11B; 904 of FIG. 13A). When integrated on a kitchen counter (1100), such as shown in FIG. 13B, the display surface may show recipes, shopping lists, to do lists, weekly menus, etc. (see 1104 of FIG. 13B).

Moreover, the interactive display devices may provide interaction with other devices, such as Amazon Alexa, Google Home and Nest, among others, to provide alerts, announcements, etc. on the display. These are just a few examples of how the interactive display devices can be incorporated into surfaces in a user's environment. Additional examples are provided hereinbelow.

Overview of the Layers of the Interactive Display Surface

The interactive display device of the present invention is formed by an assembly of multiple layers that include at least a sensor layer and a light layer, and a microcontroller. The assembly may be integrated with a non-transparent surface layer, such as to form a panel or part of an object (e.g., wall, floor, door, furniture, etc.), so that it blends seamlessly with the environment, such as with the surface of a piece of furniture.

Figure 1B:
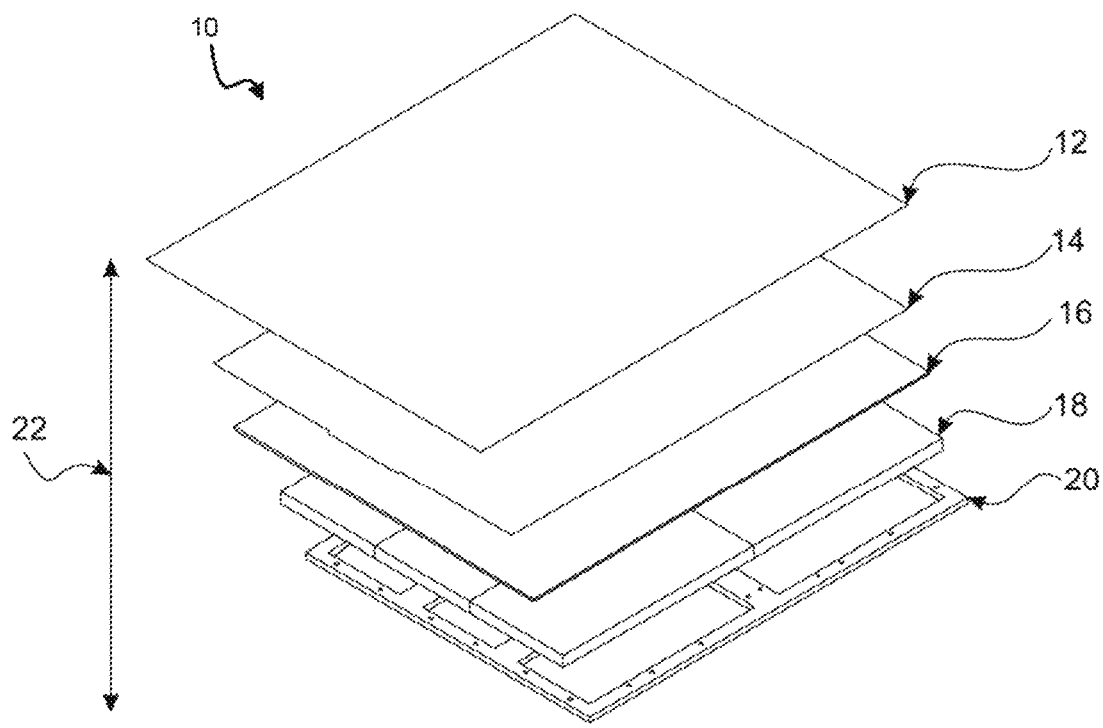

With specific reference to the figures, perspective and exploded views of an assembly forming an interactive display of the present disclosure are shown in FIGS. 1A and 1B, respectively. The assembly 10 comprises a frameless outer perimeter 2, a top surface 11, a bottom surface, and a plurality of layers therebetween including at least a sensor layer 14 and a light layer 18, each of which generally extend to the outer perimeter 2 of the assembly 10 so that the entire surface 11 of the assembly is configured to receive input from the sensor layer 14 and provide output on the light layer 18. Between the sensor layer 14 and the light layer 18 is an insulation or barrier layer 16 that is substantially transparent.

Figure 2:
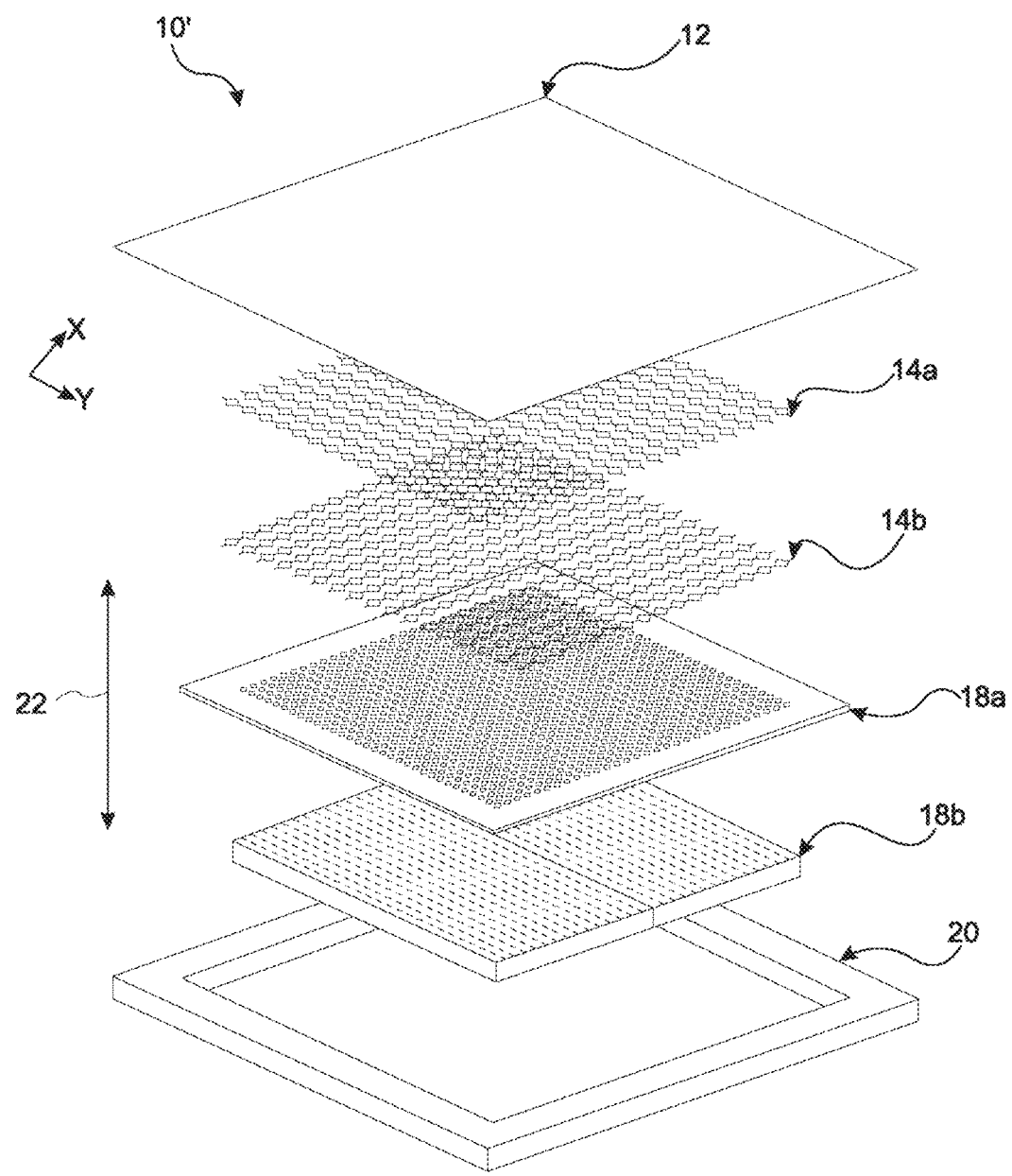
FIG. 2 illustrates layers of an interactive display according to the present disclosure.

An alternative assembly 10' of the present disclosure is illustrated in FIG. 2, wherein the sensor layer is shown to include two layers (14a, 14b) that comprise nanowires or conductive traces directed in either the x direction (14b) or the y direction (14a). The assembly further includes a low-profile light guide 18a position above the light layer 18b. In this embodiment of the assembly 10', the light layer 18b comprises light elements positioned in a grid pattern, wherein the light guide 18a includes openings positioned over each of the light elements that may support and/or focus the light from the individual light elements. Moreover, the openings of the light guide 18a may offer the ability to provide pixel size control for a given LED or OLED bulb size. The lenses will allow smaller LED bulbs to be converted into larger pixels displayed on the surface, and conversely may allow larger LED bulbs to be converted into smaller pixels displayed on the surface.

The light guide 18a may contact the light layer 18b with no intervening gaps or layers, other than bonding agents or adhesives. Moreover, the light guide 18a may contact the sensor layer (either of 14 or 14a, 14b) with no gaps or layers, other than bonding agents or adhesives. The light guide 18a may contact an insulation layer positioned beneath the sensor layer (either of 14 or 14a, 14b) with no gaps or layers, other than bonding agents or adhesives.

Beneath the light layer (18, 18b) of either assembly is a support layer 20 that provides rigidity to the device and a bottom surface, i.e., outward facing side of the support layer 20. Moreover, each of the assemblies (i.e., as shown in FIGS. 1B and 2, and described herein) include a microcontroller comprising at least a processor, a memory, and a wireless transceiver circuit providing wireless communication with an external server or the internet.

The assemblies illustrated in FIGS. 1B and 2, which include at least the support layer 20, light layer 18, and sensor layer 14, may be integrated with a non-transparent surface layer 12 in any of the structures or surfaces discussed herein (i.e., wall, furniture, panel, etc.). The non-transparent surface layer 12, wherein the outward facing surface forms the top surface 11, may be bonded to the sensor layer 14 by a substantially transparent adhesive or bonding agent, thus forming an interactive display having a non-transparent surface.

Each of the various layers of the assembly 10 will be described in greater detail hereinbelow with reference to FIGS. 1B, 2, and 3.

(a) The Non-Transparent Surface Layer

The non-transparent surface layer 12 serves as a user's point of contact with the interactive display surface and provides the seamless integration of the assembly within any of the environments described herein (i.e., office, kitchen, restaurant, etc.). The surface layer 12 also serves as an integral part of the assembly when the interactive display is embedded in a structure, such as a wall, panel, furniture surface, etc., providing a non-transparent surface under which the assembly is hidden when inactive. When a user interacts with the top surface 11, such that the sensor layer 14 registers a contact, the light layer 18 may be activated to display digital information.

While clear glass and plastics allow for near perfect transmission of led light through their surfaces, opaque and translucent materials diffuse this light producing a different effect for the transmission of information and data. Therefore, given that different materials diffuse light differently, selection of the surface material and thickness thereof may take into consideration proper diffusion. As an example, when utilizing the diffusion properties of natural wood, the grain pattern and thickness may be selected to allow for the proper display of information. According to aspects of the present disclosure, the non-transparent surface layer is generally 0.5 mm to 5 mm thick, such as less than 1 mm thick for wood veneers or up to 3 mm thick for plastic veneers.

The non-transparent surface layer may be at least 0.3 mm thick, such as at least 0.4 mm, or at least 0.5 mm, or at least 0.6 mm, or at least 0.7 mm, or at least 0.8 mm, or at least 0.9 mm, or at least 1.0 mm, or at least 1.1 mm, or at least 1.2 mm, or at least 1.3 mm, or at least 1.4 mm, or at least 1.5 mm, or at least 1.6 mm, or at least 1.7 mm, or at least 1.8 mm, or at least 1.9 mm, or at least 2.0 mm. The non-transparent surface layer may be not greater than 5 mm thick, such as not greater than 4.9 mm, or not greater than 4.8 mm, not greater than 4.7 mm, not greater than 4.6 mm, not greater than 4.5 mm, not greater than 4.4 mm, not greater than 4.3 mm, not greater than 4.2 mm, not greater than 4.1 mm, not greater than 4.0 mm, not greater than 3.9 mm, not greater than 3.8 mm, not greater than 3.7 mm, not greater than 3.6 mm, not greater than 3.5 mm. Any combination of a minimal thickness and a maximum thickness disclosed herein may be combined to define a range of thickness measurements for the surface layer 12.

The surface layer may comprise natural materials, such as hardwood or softwood veneers, stone veneers, and ceramic veneers. Exemplary wood veneers include at least veneers of maple, oak, ash, birch, beech, poplar, walnut, mahogany, pine, teak, basswood, bamboo, balsam, aspen, cedar, spruce, elm, hickory, ebony, rosewood, keruing, ziricote, and wenge. Exemplary stone veneers include at least veneers of marble, limestone, granite, slate, sandstone, laetrete, nice stone, quartzite, travertine, and basalt. Exemplary ceramic veneers include at least veneers of feldspathic ceramic, leucite-reinforced glass ceramics, lithium disilicate reinforced glass ceramics, porcelain, earthenware, and stoneware.

The surface layer may comprise natural fabrics such as silk, cotton, chifon, linen, canvas, satin, viscose, rayon, damask, denim, twill, felt, cheesecloth, corduroy, muslin, lace, and tweed. The surface layer may comprise natural fibers such as wool, cashmere wool, jute, and bamboo and other grasses.

The surface layer may comprise animal skins, such as leather and suede.

The surface layer may comprise synthetic fibers such as aramids, polyester, spandex, nylon, and polypropylene. The surface layer may comprise polymeric surfaces, such as acrylic, nylon, polycarbonate, high density polyethylene, low density polyurethane, cellulose resin, epoxy or epoxy resins, PMMA, phenolic resins, and the like.

The surface layer may comprise papers such as acid-free paper, blotting paper, copy and copier paper, manilla paper, newsprint paper, parchment paper, photographic paper, waxed paper, or vellum.

The surface layer may comprise composite veneers such as so-called "solid surface" materials, e.g., "Corian" and similar materials, carbon fiber, fiberglass, cement, or concrete.

The surface layer may include a paint or coating, such as an acrylic or latex based paint, a lacquer-based coating, and alkyd-based paints, a metallic paint, a siloxane or "dry erase paint", and the like. Moreover, the surface layer may comprise a standard wall covering, such as wallpaper or wall board, paperboard, and the like.

The surface layer may comprise a metal foil, such as nickel, carbon steel, Inconel, brass, copper, aluminum, titanium, or metalized polyester.

(b) The Sensor Layer

Positioned below the non-transparent surface layer 12 is the sensor layer 14, which is configured to provide interactive feedback to the system through touch sensing, i.e., touch sensor layer. There are several types of technologies for implementing a touch sensor including for example resistive, capacitive, infrared, surface acoustic wave, electromagnetic, and near field imaging, among others.

Capacitive touch sensing devices have been found to work particularly well, such as either of surface capacitance or projected capacitance (self-capacitance or mutual capacitance). Generally speaking, whenever two electrically conductive members come close to one another, their electric fields interact to form capacitance. In the case of a capacitive touch device, when an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the location, pressure, direction, speed and acceleration of the object as it is moved across the touch surface.

Figure 5:
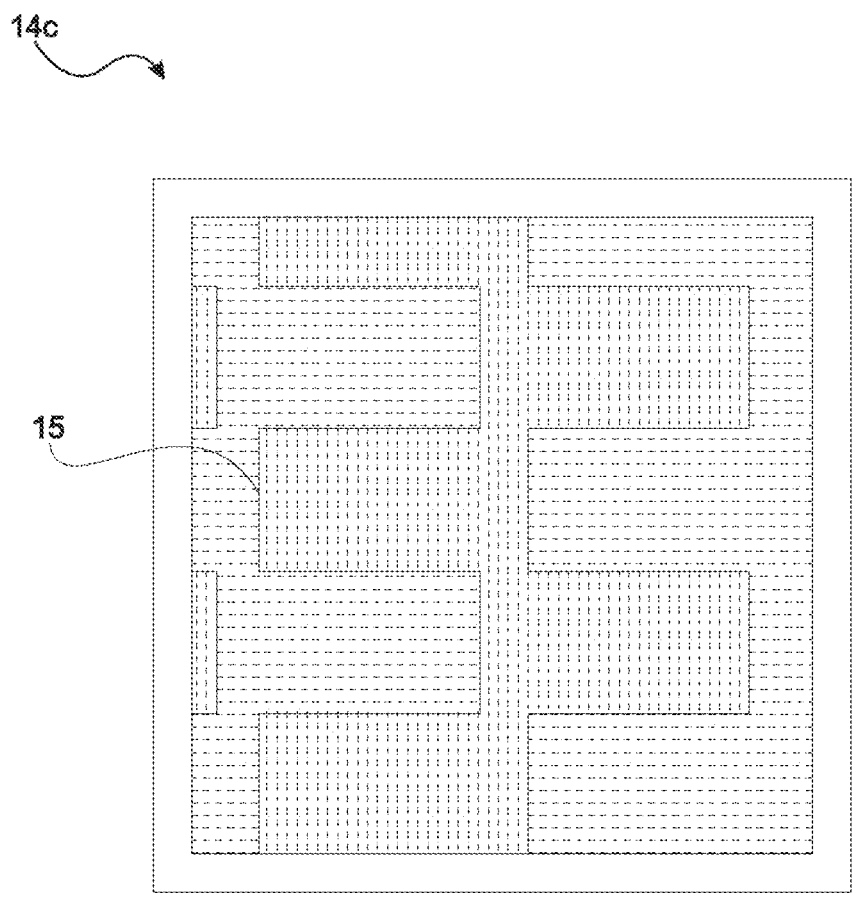
FIG. 5 illustrates a capacitive touch sensor layer formed using conductive paint that includes laser-cut zone separations according to the present disclosure.
Figure 6A:
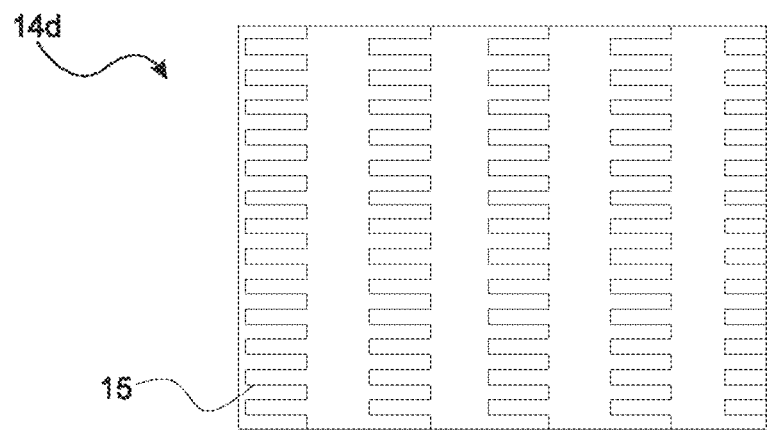
FIGS. 6A and 6B illustrate capacitive touch sensor layers formed using an Indium tin oxide (ITO) coated polyethylene terephthalate (PET) substrate with laser-cut zone separations according to the present disclosure.
Figure 6B:
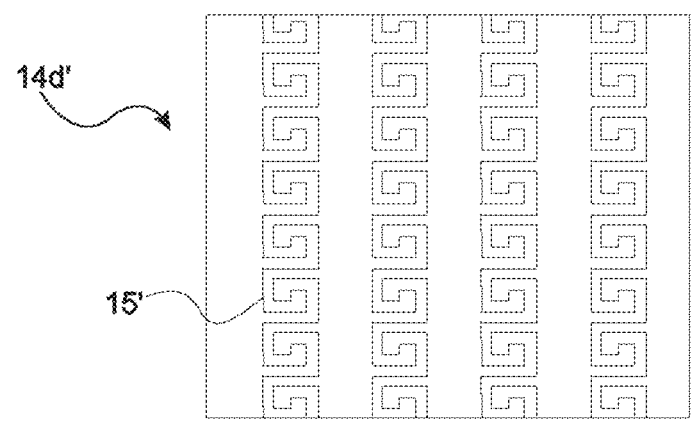

Capacitive touch sensing surfaces may be formed using a wide range of conductive materials generally applied to or supported on a substrate (e.g., polyethylene terephthalate (PET) plastic), such as grids of nanowires and/or traces printed by conductive inks (FIGS. 2, 4, and 6C-6E), and surfaces covered by velostat, or coated with a conductive paint (FIG. 5) and/or indium tin oxide ("ITO") (FIGS. 6A and 6B). It will be obvious to one skilled in the art that a wide variety of substrates and materials analogous to PET, nanowires, conductive inks, velostat, conductive paint, and ITO can be substituted for those described herein to achieve a similar result and all such substitutes are hereby incorporated.

Figure 3:
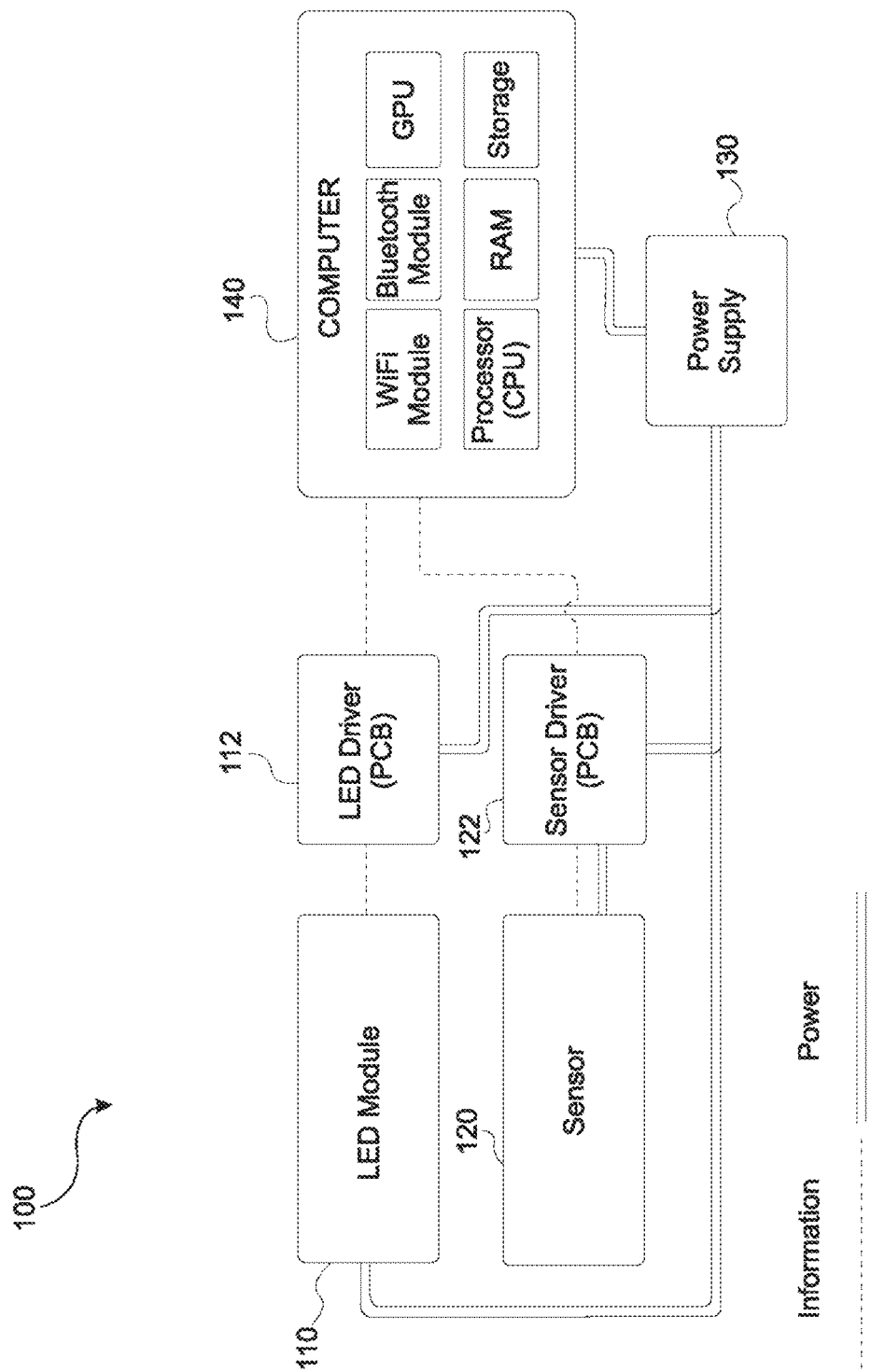
FIG. 3 illustrates a wiring diagram of an interactive display according to the present disclosure.
Figure 4:
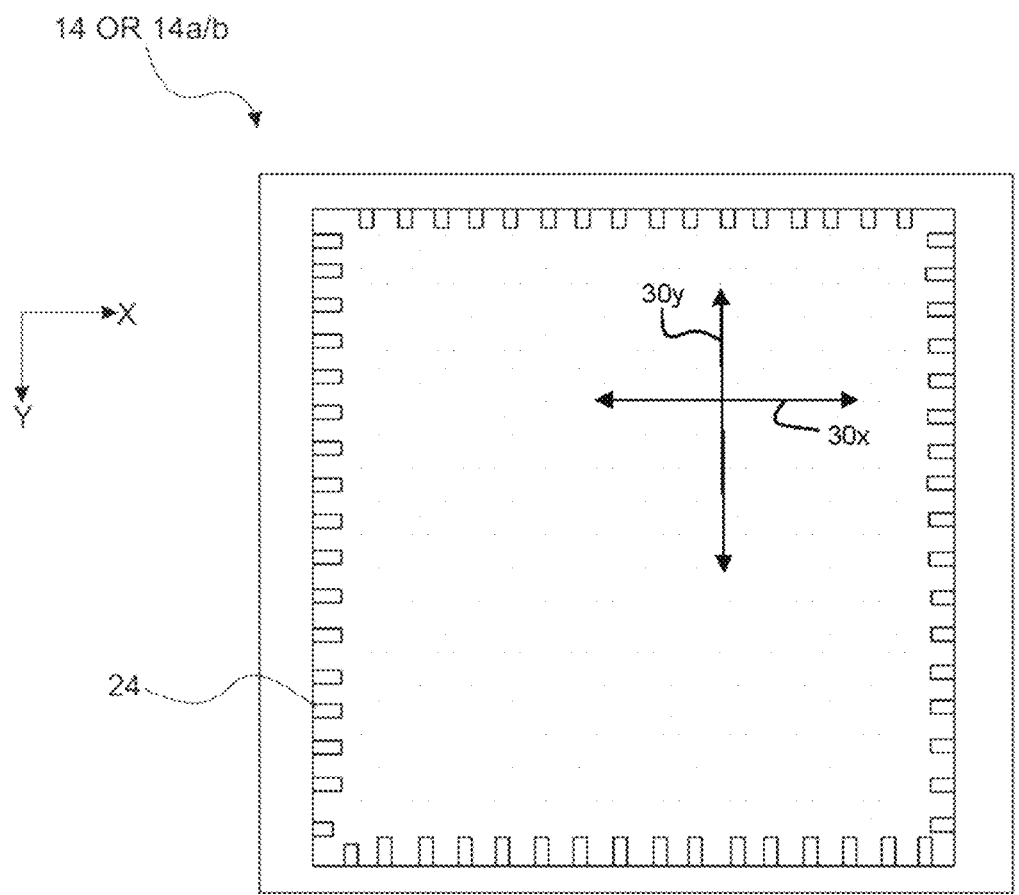
FIG. 4 illustrates a capacitive touch sensor layer according to the present disclosure.

Specific arrangements of the sensor layer are shown in the figures, wherein FIG. 4 illustrates a sensor layer arrangement comprising an X and Y grid (30$x$, 30$y$, respectively) of connection points 24 (e.g., bus) wherein capacitive sensing of a position on the sensor layer (i.e., as sensed by the grid of connection points 24) may be received by a sensor driver or controller, such as the sensor driver or printed circuit board shown in FIG. 3. For example, the sensor layer shown in FIG. 4 may comprise a substrate coated with a conductive paint, ink, or ITO, or covered with a conductive material such as velostat. Specific examples are shown in FIG. 5, and FIGS. 6A and 6B, that include a PET substrate having a conductive paint or various arrangements of an ITO coating. Electrodes positioned at perimeters of the coated surface may sense contact, as with the grid of connection points shown in FIG. 4. To improve positional recognition of a touch contact on a sensor layer, such as those that include a full surface coated with velostat or conductive paint (14$c$) or ITO (14$d$, 14$d'$), electric field tomography and a single step gauss newton method may be used to produce tomographic reconstruction, which may simplify the sensor layout (e.g., require fewer connection points 24).

Also shown in FIG. 5, FIGS. 6A and 6B are etched patterns (15, 15') that may isolate regions of the conductive surface so that varied responses may result, i.e., activation of different regions of the light layer and/or activation of the light layer to provide different digital information.

Shown in FIG. 6C is an arrangement of electrodes positioned along x and y axis on a substrate to form the sensor layer 14. FIGS. 6D and 6E show the electrodes on each axis separately for clarity, wherein electrodes 32$x$ on the x-axis are shown in FIG. 6D, and electrodes on the y-axis 32$y$ are shown in FIG. 6E. Exemplary electrodes include at least nanowire, such as a fine gauge wire (<0.001" in thickness). Also shown in FIGS. 6D and 6E are the traces to a common access "tongue" (34$x$, 34$y$) which connects to the sensor driver.

Other means to provide interactive feedback with a surface that are possible, and within the scope of the present disclosure, include at least force sensing resistors (FSR), infrared sensors, thermal sensors, lidar sensors, sound or vibration sensors, and time of flight (TOF) laser arrays. Use of an FSR also offers the ability to measure force/depth of touch, thereby distinguishing a light touch from a heavy push. As such, in embodiments where the sensor layer is an FSR, or includes an additional sensor layer comprising an FSR, the interactive display surface may also be configured to measure a weight of an object, such as such as fruits, vegetables and other cooking ingredients.

(c) The Light Layer

The light layer 18 renders the digital information so that it is viewable on the top surface 11 of the assemblies and devices of the present disclosure. In certain embodiments, the light layer comprises a plurality of light elements or pixels, such as light emitting diodes, e.g., red-green-blue (RGB) or red-green-blue-white (RGBW) light emitting diodes (LED'S), organic LED'S (OLED), or a liquid crystal display (LCD) backlit by any of LEDs, fluorescent or cold cathode fluorescent light, or laser projection. The light layer 18 could also be a digital light processing (DLP) display, or a plasma display. As is known in the art, the light layer may include programmable elements that emit and/or block light to generate images.

According to certain aspects, and as shown in FIG. 2, the light layer 18b may include a low-profile light guide 18a which may support, focus, and/or resize the light from the individual light elements. As indicated above, the light guide 18a includes openings positioned over each of the light elements that may support, focus the light from the individual light elements, and/or provide pixel size control for a given LED or OLED bulb size. The lenses will allow smaller LED bulbs to be converted into larger pixels displayed on the surface, and conversely may allow larger LED bulbs to be converted into smaller pixels displayed on the surface.

(d) The Insulation Layer

The buffer or insulation layer 16 serves to isolate electromagnetic interference from the light layer 18, thus preventing false readings at the sensor layer 14. This layer may be comprised of transparent or semitransparent polymers including polycarbonate, acrylic resins or epoxies, polyethylene terephthalate (PET or PETE) or polyethylene terephthalate glycol (PETG), polyesters or copolyesters, and polyvinyl chloride (PVC). Glass or silicon-based products such as soda-lime glass, crystal glass, cast or extruded glass fibers, sapphire, borosilicate glass, glass ceramic, quartz and quartz glass, and aluminosilicate glass.

A thickness of the insulation layer 16 may be determined by the density of light elements on the light layer 18. For example, the insulation layer 16 may have a thickness that is at least equal to or greater than 0.5× the pixel pitch of the light layer 18, e.g., pitch of the light elements in the light layer. In a specific example, an assembly comprising a light layer formed with LEDs positioned in a grid with a pitch of 2 mm would include an insulation layer that is at least 1 mm thick, such as 1.5 mm thick, or 2 mm thick, or greater. Alternatively, the insulation layer may have a thickness that is not linked to the pixel pitch, i.e., pitch of the light elements on the light layer, and may thus have a thickness that is determined by the material of the layer, and the ability of that material to block electromagnetic interference (EMI).

The insulation layer 16 may further include lenses positioned over individual light elements or pixels that may focus or diffuse light from the light elements, such as shown in FIG. 7A, wherein the insulation layer 16 includes a grid of lenses 19. As shown in FIG. 7B, which is an enlargement of detail B from FIG. 7A, and FIG. 7C, the lenses 19 may be formed as depressions in the insulation layer that focus the light from the individual light elements or pixels. Such depressions may be thermoformed or milled and may assist in refocusing light diffused by passage through the non-transparent surface layer, and/or by passage through the lower regions of the insulation layer and the sensor layer.

Alternatively, the lenses may be formed as protrusions on the insulation layer, such as thermoformed or bonded on the insulation layer, and may diffuse the light from the light from the individual light elements or pixels.

In preferred embodiments, the assembly 10 includes the light layer 18 and insulation layer 16 shown in FIG. 1.

(e) The Support Layer

A base structural or support layer 20 is included to provide rigidity to the system, and generally forms the bottom surface of the interactive display device. The support layer 20 may include a recess formed therein to accommodate the microcontroller, such that the microcontroller is positioned between the support layer and the light layer.

The support layer may be a metal such as any of an aluminum or aluminum alloy, an iron or iron alloy, steel or steel alloys, magnesium or magnesium alloys, titanium or titanium alloys, zinc or zinc alloys, nickel or nickel alloys, and copper or copper alloys.

The support layer may also be a polymer or resin, such as any of nylon, polycarbonate, high density polyethylene, polyurethane, acetal, polyester, PMMA, phenolic, and cellulose resins.

The support layer may be a composite material laminated with any of an epoxy or epoxy resin, a polyester resin, a carbon fiber, fiberglass, silicon, concrete, porcelain, earthenware, stoneware, natural or synthetic fibers or fabrics, natural or synthetic paper or boards, alumina, silicon nitride, tungsten carbide, zirconia, silicon carbide, or boron carbide. The support layer may be a material such as "Corian" and the like.

The support layer may be a wood or wood-based material, such as hardwoods or softwoods (see for example any of the wood materials listed hereinabove for the surface layer), plywood, low medium or high-density fiberboard (LDF, MDF, HDF), or particleboard. The support layer may be an environ panel or the like consisting of soy based or thermosetting resin or reinforced with natural or synthetic fiber.

The support layer may be glass and silicon-based materials such as soda-lime glass, crystal glass, cast or extruded glass fibers, sapphire, borosilicate glass, glass ceramic, quartz and quartz glass, or aluminosilicate glass.

(f) Bonding Agents

Various layers of the assembly may be bonded together by a bonding agent that allows for the adhesion of layers and transmission of light. Depending on the layers used, the bonding agent may comprise any of an epoxy or epoxy resin, a polyurethane, a urethane, a urethane acrylate ester, an acrylic, a silicone, a polyvinyl acetate, a cyanoacrylate, natural rubber, gum mastic, gum arabic, and so-called "plastic cements" such as dichloromethane (DCM or methylene chloride) and the like.

The sensor layer may be bonded to the non-transparent surface layer. Additionally, other layers may be bonded, such as the support layer to the light layer, the light layer to the insulation layer, or in certain embodiments to a light guide when included. The insulation layer, or light guide when included, may be bonded to the sensor layer, etc. thus formed, the assembly becomes a rigid, self-supporting device that may be easily integrated within, and even form a structural component of, walls, floors, doors, panels, furniture, and any of the other articles disclosed herein.

(g) Wiring, Microprocessor, and Communication

Power may be provided to the various layers and to the microcontroller via standard cables and electrical circuitry (see FIG. 3). For example, the interactive display surface may receive power from a standard wall outlet that is stepped down from 110V to 5V via a power converter. The power converter may be part of the assembly or may be provided exterior to the assembly. Alternatively, the interactive display surface may be powered by a rechargeable battery integrated in the assembly, wherein the battery may include a connector allowing power for recharging functions to be provided from a standard wall outlet.

User interaction with the non-transparent surface layer 12 (i.e., top surface 11) may be controlled via signals sent from the sensor layer to the microcontroller, and signals received by the light layer from the microcontroller. As shown in FIG. 3, the microcontroller includes a processor (CPU), a graphical processing unit (GPU), memory (RAM), a storage device, and one or more communications modules (Bluetooth and Wi-Fi). Each of the components are interconnected using various buses and may be mounted on a common motherboard or in other manners as appropriate. The processor (CPU and/or GPU) can process instructions for execution within the computing device, including instructions stored in the memory or on the storage device to display graphical information on the light layer.

Various implementations of the digital information displayed on the surfaces described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor (CPU and/or GPU of FIG. 3), which may be special or general purpose, coupled to receive data and instructions from, and to transmit data and instructions to, a storage system, at least one input device, and at least one output device.

The processes and logic flows for the various implementations of the interactive display surfaces described herein can be performed by one or more programmable processors executing one or more computer programs to perform functions by operating on input data, such as from the sensor layer and sensor driver, and generating output, such as to the light driver and light layer (see FIG. 3).

To provide for interactions with a user described herein, one or more aspects of the disclosure are implemented by specialized software algorithms executed by the microcontroller. At the very least, basic functionality is written to determine x/y coordinates, and to produce several effects with the led output at these coordinates is stored on the memory and executed by the processor of the microcontroller. Additionally, swipe gesture detection can be determined by comparing x or y sensor trips to an array of previously captured data. Gestures can be used to switch between states or functions, or to provide additional functionality within a given program.

Embodiments of the Interactive Display Surface

According to aspects of the present disclosure, a non-transparent interactive display surface is provided that includes a non-transparent surface layer of 0.5 mm to 5 mm thickness, such as less than 1 mm thick for wood veneers or up to 3 mm thick for plastic veneers. The surface layer is direct contact bonded to a sensor layer, such as capacitive touch sensor layer. Beneath the sensor layer is a substantially transparent insulation layer that is positioned over a light layer, such as formed by a grid of LED light elements. The LED lights may be RGB or RGBW LED's arranged in a grid, such as a grid having a 2 mm pitch. The insulation layer may have a thickness that is linked to a pitch of the light elements on the light layer, and thus may be not less than 1 mm thick, or may be independent of such (i.e., thickness that is determined by the material of the layer, and the ability of that material to block electromagnetic interference (EMI), and not the pitch of the light elements). Finally, a microcontroller may be included in a recess in a support layer that is position below the light layer.

Accordingly, the present invention provides for a novel layering of (1) a thin layer of non-transparent veneer, (2) a sensor layer, (3) an insulation layer that provides electromagnetic separation, and (4) a light layer. The present invention provides for a novel layering of (1) a thin layer of non-transparent veneer, (2) a sensor layer, (3) a light guide layer, and (4) a light layer.

Figure 10A:
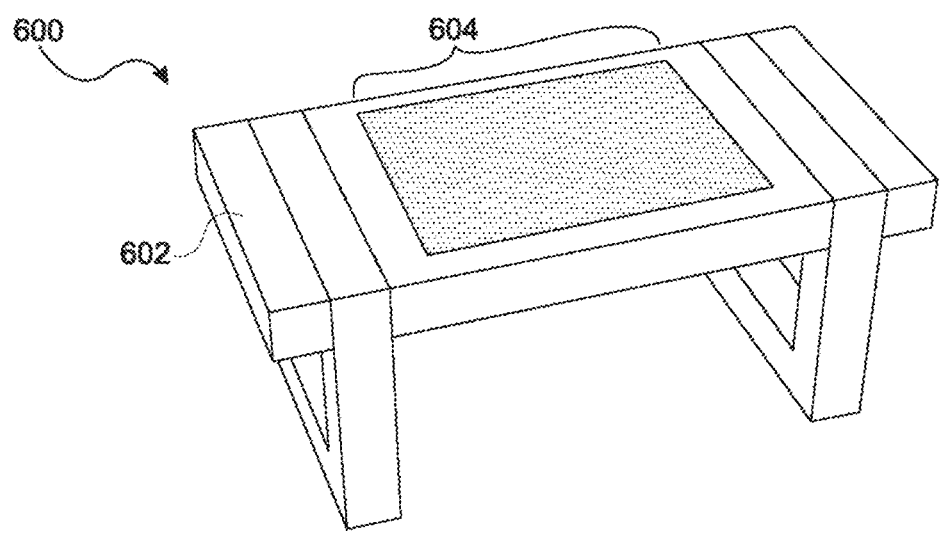
FIGS. 10A-10D illustrate an interactive display surface integrated into different types of furniture according to the present disclosure including a coffee table, a bed side table, a desk or counter, and a table, respectively.
Figure 10B:
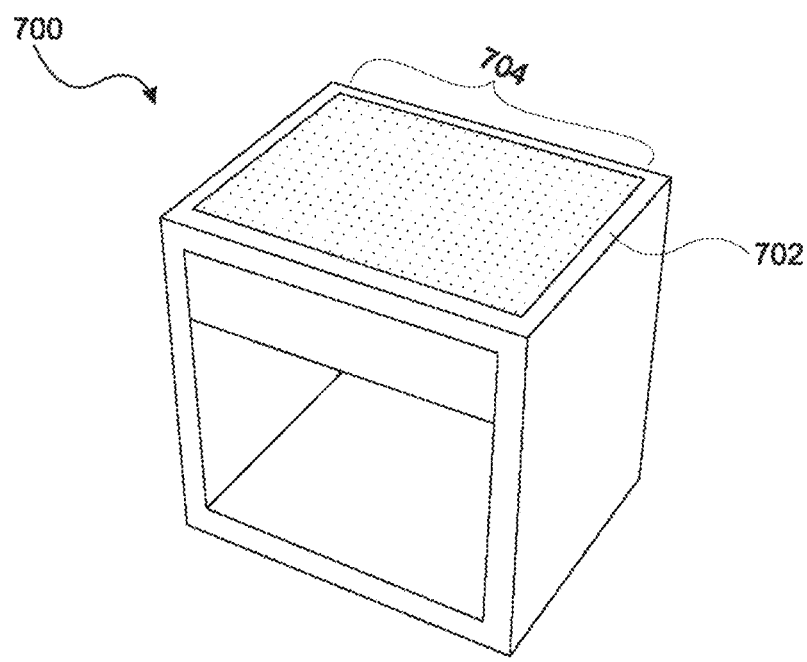
Figure 10C:
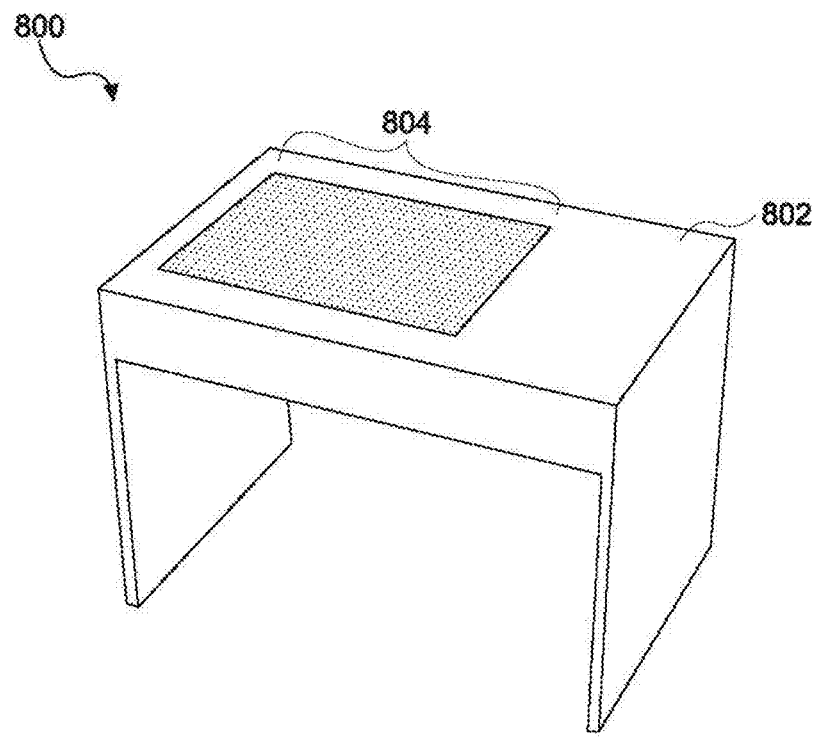
Figure 10D:
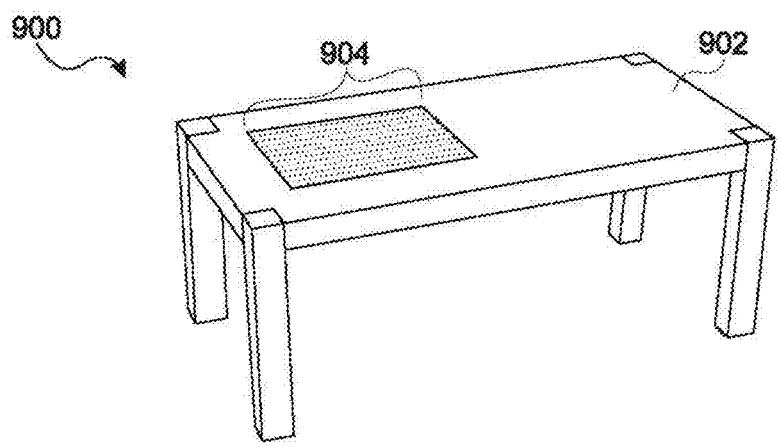

These layers are assembled to form an interactive touch screen that can be integrated into a multitude of surfaces in a wide variety of environments and is configured to display digital information. For example, the interactive display surface may be integrated with furniture, such as a table as shown in FIGS. 10A and 10D, a desk as shown in FIG. 10C, or a bedside table as shown in FIG. 10B. As shown in FIGS. 10A-10D, a position of the interactive display device is noted by illumination of all of the light elements of the light layer such that they are depicted as a visible grid. In the passive state, however, the interactive display device would not be visible on the surface of any of these furniture embodiments. Moreover, while shown to be incorporated on only a portion of the furniture surface, since the interactive display device is frameless, the sensor and lighting regions of an integrated surface could extend to edges of that surface (e.g., to one or more edges of the tabletop).

Figure 11A:
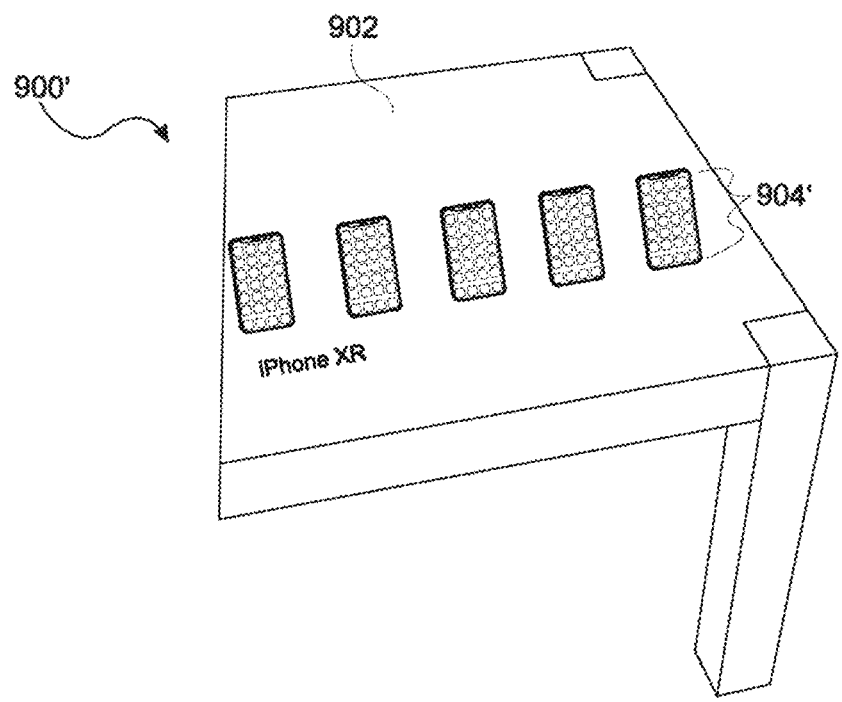
FIGS. 11A and 11B illustrate an interactive display surface integrated into different types of commercial furniture including a retail display and a restaurant/bar tabletop or countertop, respectively.
Figure 11B:
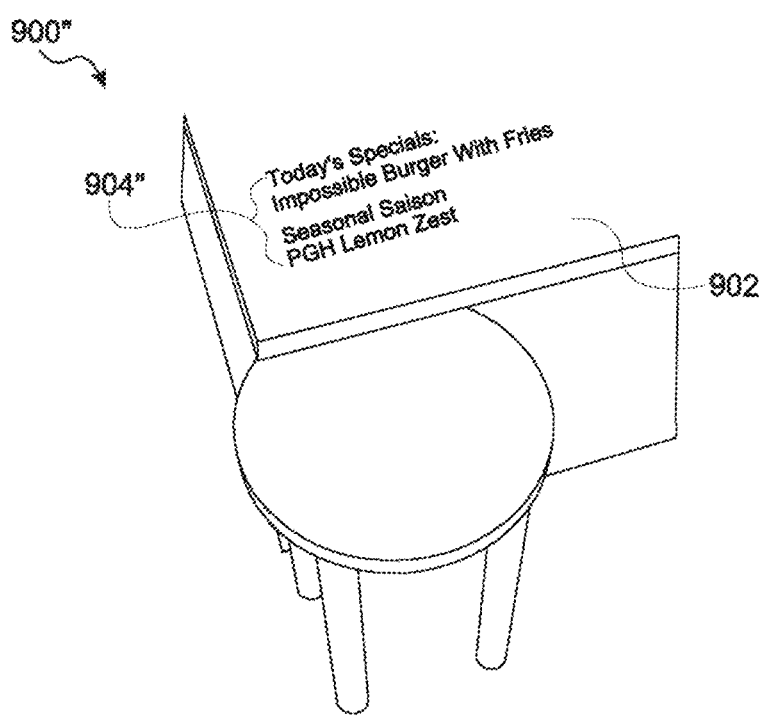
Figure 12A:
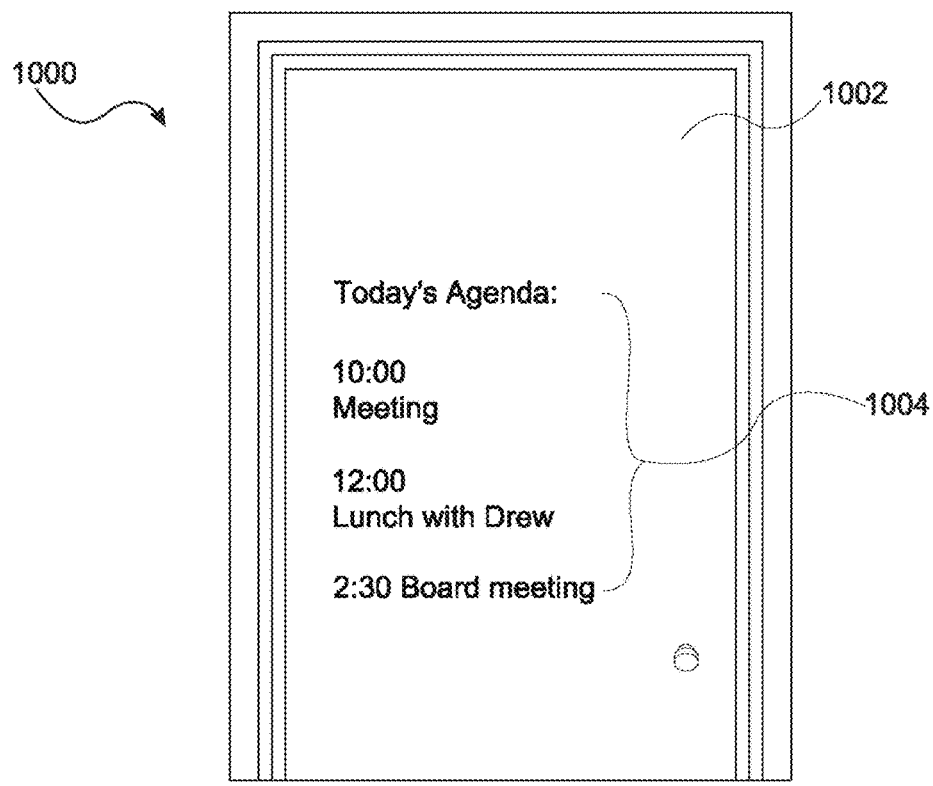
FIGS. 12A and 12B illustrate an interactive display surface integrated into different types of doors including an office or retail door and an interior residential door, respectively.
Figure 12B:
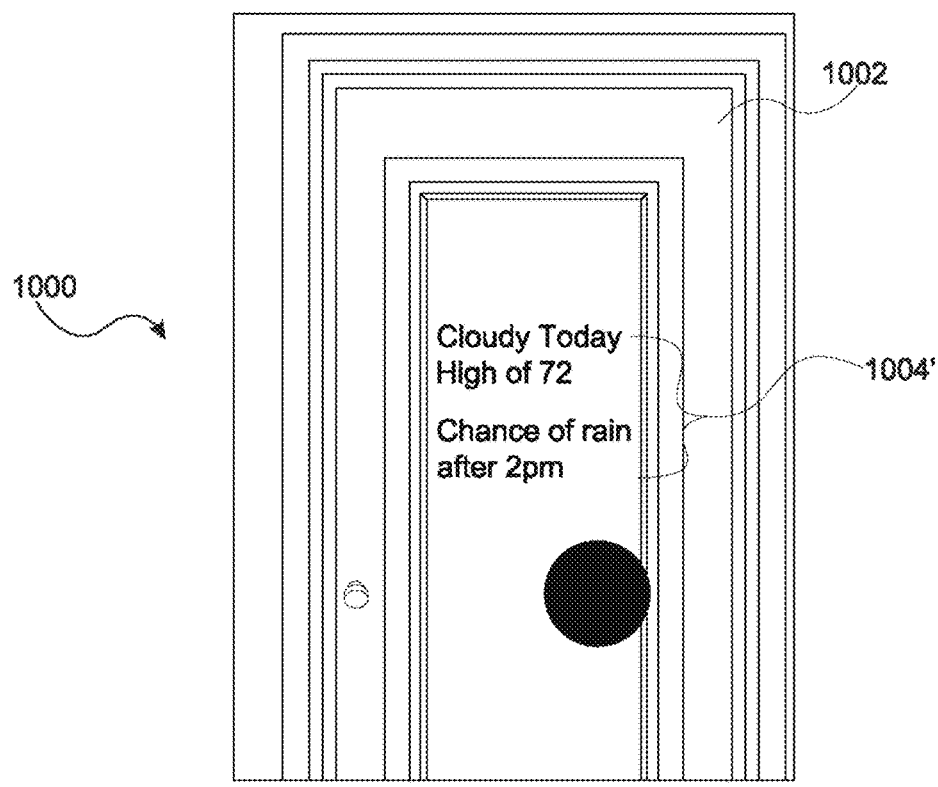
Figure 13A:
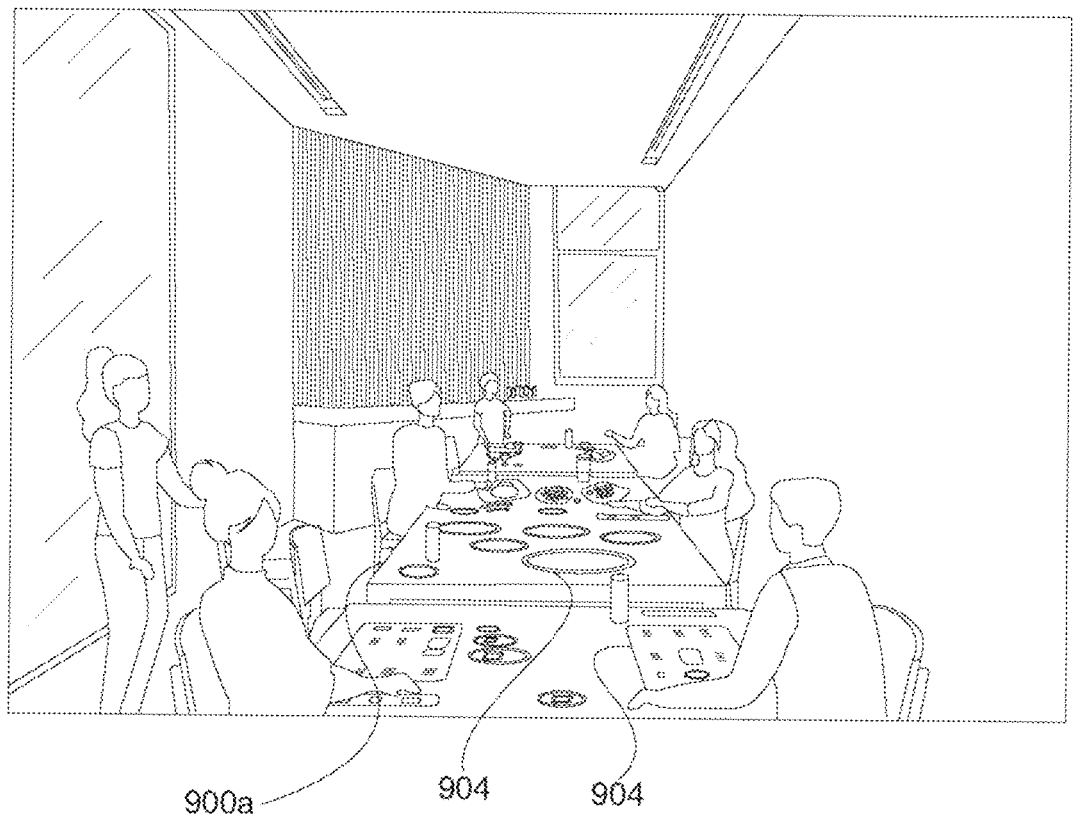
FIGS. 13A and 13B illustrate multiple interactive display surfaces incorporated into tables at a restaurant and a countertop in a residential kitchen, respectively.
Figure 13B:
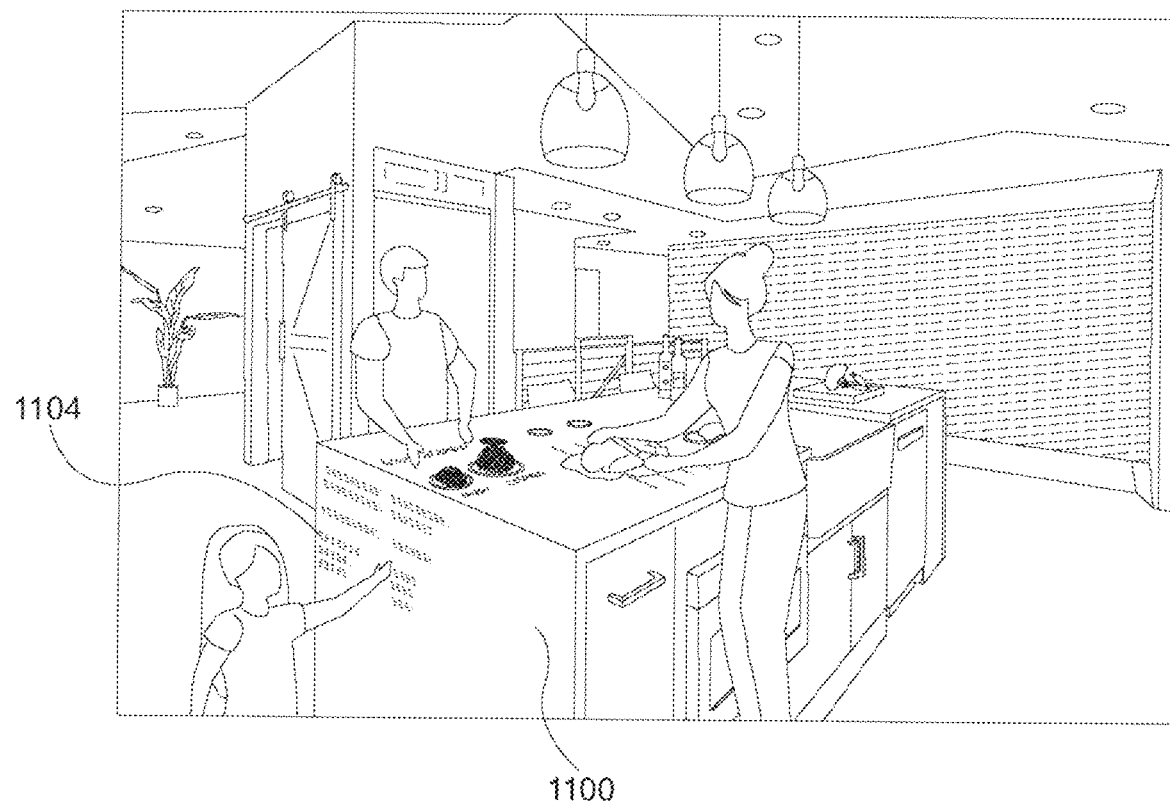

The interactive display surface may be integrated with a table or counter in a retail establishment, such as shown in FIG. 11A, or in a restaurant, such as shown in FIGS. 11B and 13A. The interactive display surface may be integrated with a door, such as shown in FIGS. 12A and 12B, or on panels, such as shown in FIGS. 8A to 9B.

Figure 9A:
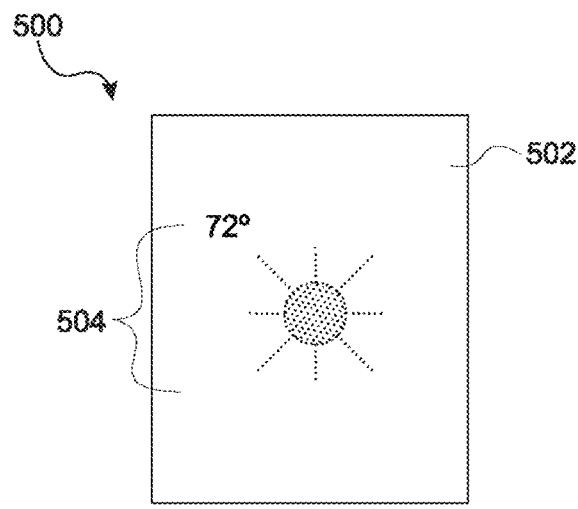
FIGS. 9A and 9B illustrate an interactive display surface according to the present disclosure showing current weather conditions.
Figure 9B:
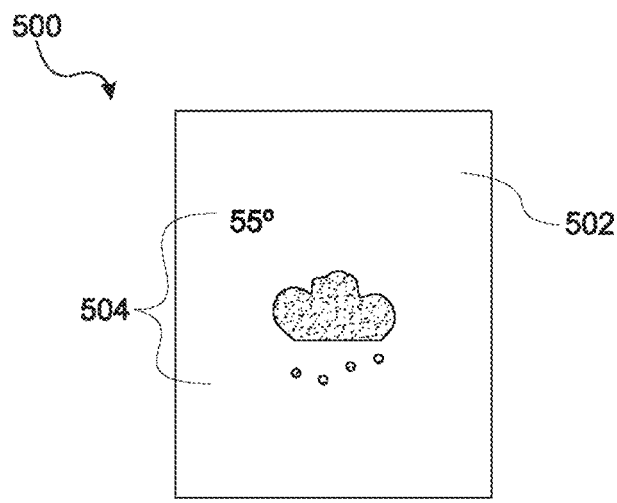

One goal of these interactive display surfaces is to present digital information, such as the weather information 504 shown in graphics and text on the display surfaces 502 of panels 500 in FIGS. 9A and 9B, or the textual weather information (1004', 1104) shown on a surface 1002 of a door 1000 in FIG. 12B or the side 1100 of a kitchen counter in FIG. 13B, respectively. Other information can include daily agendas, such as shown on the surface 1002 of a door 1000 in FIG. 12A (textual information 1004), or menu items or specials, such as shown on the surface 902 of a table 900" in FIG. 11B (textual information 904").

Another goal of these interactive display surfaces is to act as a touchpoint for social connection. That is, the interactive display surface may be configured to provide simple games that two users could play together (e.g., pong, tic-tac-toe) to encourage interpersonal interaction and to nudge behaviors for positive impact (see for example the tables 900a showing digital information 904 in FIG. 13A). There are a wide variety of games that could be provided by the interactive display surface of the present disclosure, which could be used by one or more players.

Figure 8A:
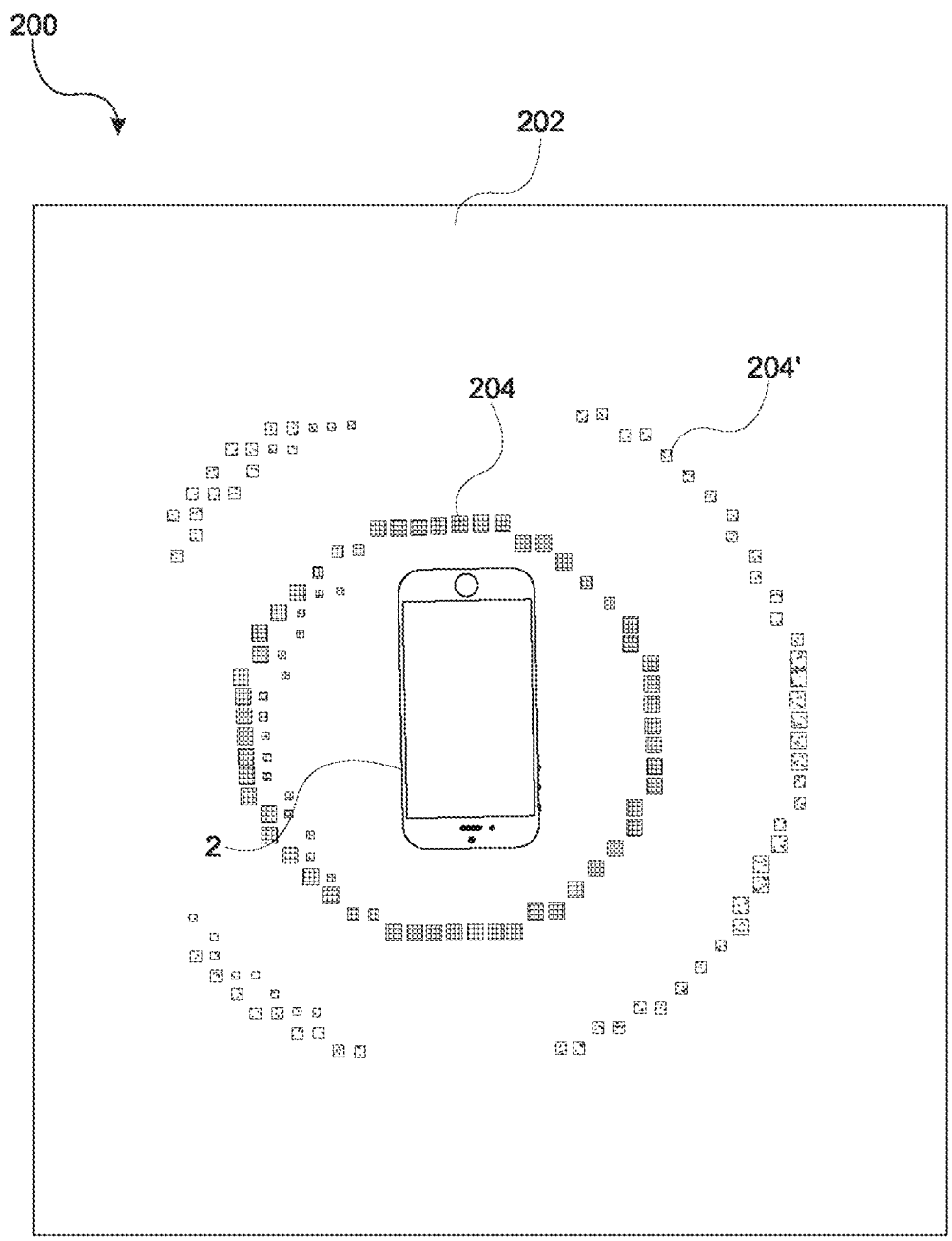
FIG. 8A illustrates an interactive display surface according to the present disclosure, wherein a localized area senses the presence of another device.
Figure 8B:
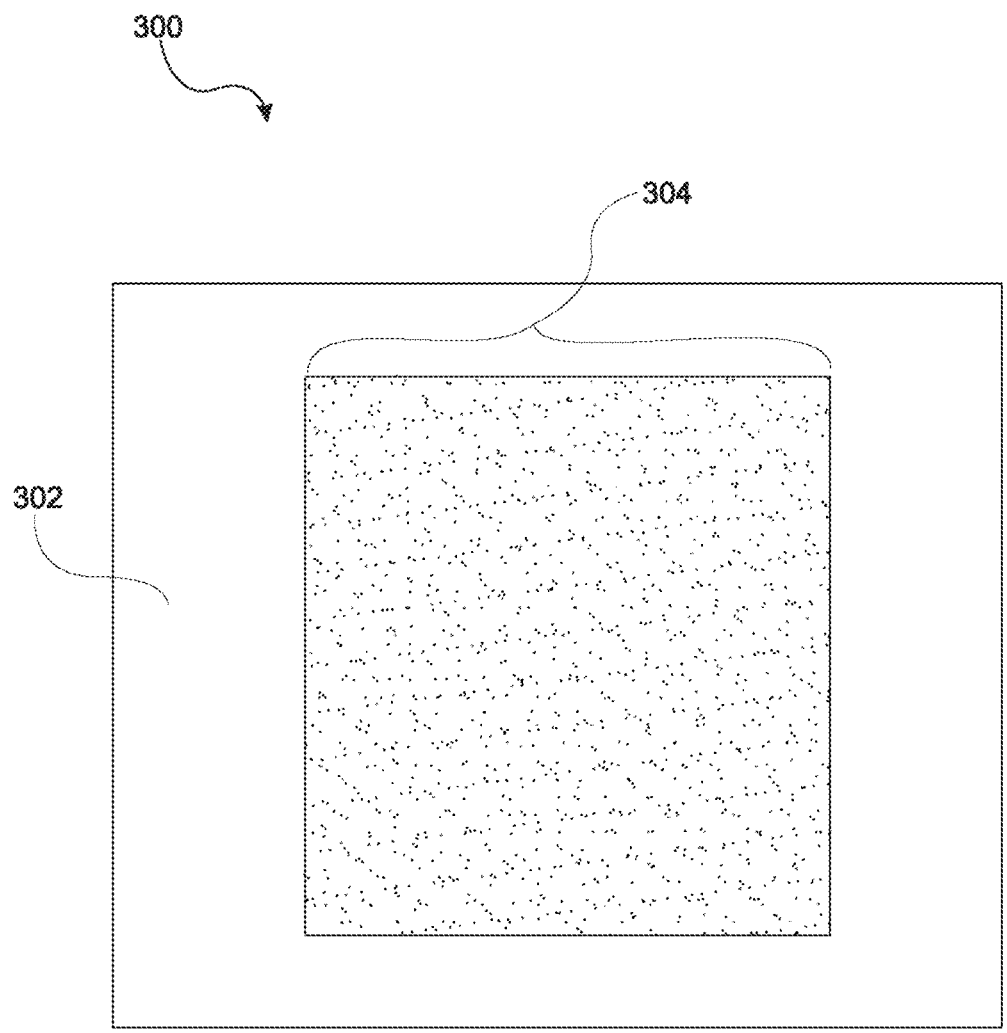
FIGS. 8B and 8C illustrate an interactive display surface according to the present disclosure showing possible variations of room illumination for a wakeup alarm.
Figure 8C:
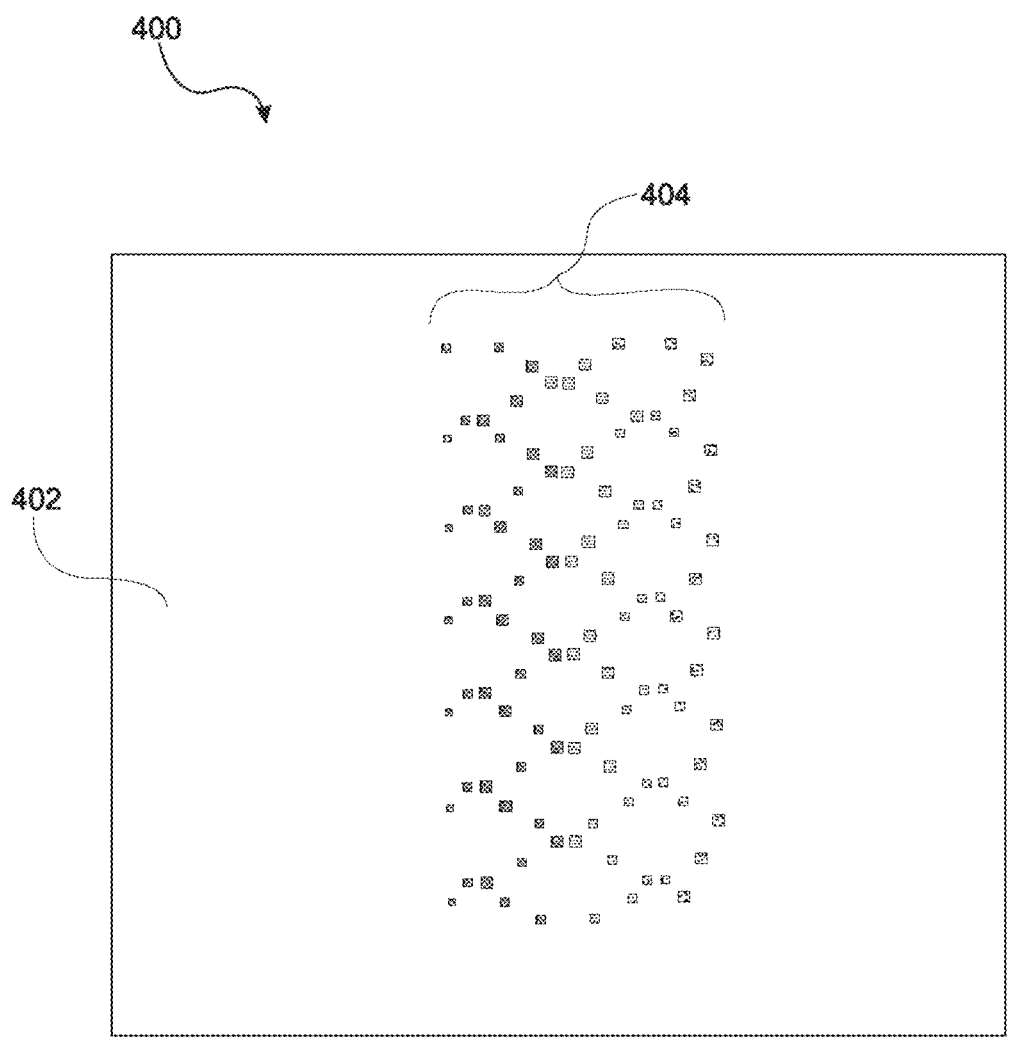

Another goal of these interactive display surfaces is to provide smart devices. For example, when included on a bedside table, such as shown in FIG. 10B, the interactive display surface could be used as an alarm clock, where its display could gradually intensify brightness at a wakeup time, such as shown in FIGS. 8B and 8C (display 304 or 404 on surfaces 302 or 402, respectively) or display a clock interface.

There are an unlimited number of functionalities or information that can be provided by various embodiments of the present invention. Some nonlimiting examples of such functionality and information (gathered and/or provided) include at least raising or lowering the temperature of a connected thermostat, raising or lowering lights, blinds, or volume levels of connected lighting, curtains, or music systems, methods for interacting with staff in retail or service environments (i.e. meal tracker or waitress call in restaurant, etc.).

Additional information that can be gathered, provided, analyzed, and/or displayed include at least health data, such as weight, heart rate, blood sugar levels, workout activities, step counts, calorie counts, activity levels, daily schedules, reminders, to-do lists, meeting requests, bank data, stock levels, water, gas, oil, food, electricity, battery, internet bandwidth consumption levels, air quality, weather data, or other environmental information, recipe information, shopping lists, menus, specials, pricing, or other retail/service information, advertising, social information from other social media or social connection apps, and navigation information.

The present invention also can also be used to transfer information to and from other devices. For example, as shown in FIG. 8A, placing a cell phone 2 on a surface with an integrated interactive display surface of the present invention may allow transfer of power to the phone, or data to/from the phone, such as notifications, or transfer control of certain phone applications to the display surface. Note the surface 202 of the table 200 on which the cell phone 2 is placed may respond to the presence of the cell phone with a visual display (204, 204').

Further yet, the present invention may also provide unique user interfaces for other electronic devices, such as by displaying a keypad or keyboard for use as an input device allowing entry of a phone number or a text message when connected to a cell phone, or for input of information on a computer, laptop, smart TV, and the like.

The present invention may also provide the ability to train UID (unique identifiers) gestures as a security measure such as for locking and/or unlocking doors, compartments, drawers, and the like.

The potential uses of the present invention are infinite and the examples provided herein are meant to illustrate and not limit the range of surfaces in which the presently disclosed interactive devices, assemblies, and surfaces can be incorporated, e.g., items and/or environments, or the types of digital information that may be displayed. Moreover, in alternative embodiments of the present invention, the interactive display surfaces have additional integrated with voice-activated TOT connectivity (Alexa, Siri, or Google home assistant integration).

The interactive display surfaces disclosed herein may also be provided with an adaptable interface that can serve as a platform for third-party app development, such as nest thermostat control, Apple HomeKit® lighting control, Sonos® music player control, and more.

The interactive display surfaces can also integrate with a variety of other technologies such as speakers and screens (e.g., computer or TV).

The interactive display surfaces can be both embodied in a specialized piece of furniture and as a technology that can be imbued into the built environment in a natural and seamless way, such as within specific specialized environments (e.g., kitchens, offices, elevators, airplane panels, etc.).

The interactive display surfaces provide beneficial use in tables, counters, desks, drawer faces, cabinets, doors, walls, and ceilings, providing users with calm, ambient information at a glance when needed, while minimizing itself into its natural surroundings when not needed. Discussions of specific embodiments and applications of the present invention should be considered to be exemplary illustrations and not limitations on the scope of the present invention.

The present invention also includes a method of making surfaces with an integrated touch screen using this novel layering. The following description provides one method of making a touch screen according to the present disclosure.

Exemplary Integrations of the Interactive Display Surface in a Table

Tables having an interactive display surface integrated therein may find use in a wide range of environments, several examples of which are provided herein. A work from home solution may allow a user to manage information from devices, reduce distractions, use ambient digital feedback to give the feeling of physical connections, enable deep work through time boxing activities, help maintain healthy habits like drinking water, standing up, switching contexts between different types of work, and may provide a trackpad for mouse and other adaptive digital tools for certain programs. When the table is included in an office or co-working space, the display may provide additional functionality (i.e., in addition to the functionality just described), including collaborative tools such as a digital whiteboard, healthier meeting habits such as helping ensure everyone is heard.

The table may be included as part of a learning environment, such as a school desk, wherein the display may assist in learning and testing activities. For example, the table may assist children in learning colors, shapes, number, letters, language, and may help improve hand eye coordination. The display may allow the user to get creative, such as by drawing on the surface with a finger. The surface may allow tech to be incorporated into the learning environment for young children in a healthy manner.

The table may be a coffee table wherein the surface provides a smart home hub, a series of multi user games (e.g., pong, air hockey, battleship, chess) and a series of board games with special conductive blocks that dynamically interact with the game (e.g., Monopoly, Catan). The surface lighting may help with meditation and to obtain moments of mindfulness through visual and auditory interactivity.

When integrated in a table within a restaurant, menus and portion sizes may be displayed on the table, and the user may place an order, customize the order, make a payment using a cell phone, split the cheque with others at the table, and may also sense for sanitization—if the table has been wiped down completely after each use. The display may also provide promotional tools, allow for group game play (e.g., group or restaurant wide activities like trivia). Such functionality can also be used in food courts at malls, airports and movie theaters.

Exemplary Integrations of the Interactive Display Surface in a Panel

Panels having an interactive display surface integrated therein may find use in a wide range of environments, several examples of which are provided herein. For example, a panel may provide interactive display of artwork for homes, retail spaces, museums, co-working spaces, airports, bars, nightclubs. A panel may be used for information displays in retail, museums, luxury brand stores; for navigational guidance in public spaces and public transport; and as signage in malls, airports, trains stations, subways, museums, government buildings, and hospitals.

Exemplary Integrations of the Interactive Display Surface in the Built Environment The interactive display surfaces disclosed herein may be integrated into the built environment, such as into a kitchen countertop, where it may provide a wide range of information and functionality, such as measuring ingredients (size estimators), use as a control panel for appliances, use as a prep station, provide views of recipes and instructions, display video tutorials.

The interactive display surfaces may be integrated in a wall to provide control of lights, sounds, temperature, or may be used in conjunction with a mobile phone or other mobile device to provide select controls for phone and tablets like answering a call, controlling the volume, etc.

The interactive display surfaces may be integrated in a door, such as a closet door to display weather and clothing recommendations; a front door to display weather and clothing recommendations (e.g., jacket, umbrella) or transit schedules (bus time, uber arrival) on an interior side, or security access pattern on an exterior side. The interactive display surface may allow users to leave messages about package deliveries on an exterior of a house door or wall, or use as doorbell, or provide signage of a home/apartment number.

The interactive display surfaces may be integrated in an elevator, such as inside the elevator car to replace control panels; or outside the doors of the elevator to integrate call buttons or floor numbers, travel direction.

The interactive display surfaces may be integrated in gyms, such as on a wall to connect with a phone for time blocking activities, workout planning, workout instructions, workout diagrams and flows, or to control music and TV.

Exemplary Integrations of the Interactive Display Surface in Transit Applications The interactive display surfaces may be integrated in a dashboard, such as to provide control information (e.g., navigation, speed, etc.), control of an infotainment system, and control of cabin functionality (e.g., lighting). Such integration may have the further benefit of providing a lower resolution design that is less distracting to the driver. The interactive display surfaces may provide information on public transit systems (e.g., trains, planes, boats, buses), such as maps, seat numbers, lighting, destination, current location, infotainment (e.g., transit wide such as a screen on a boat, or at the seat level), and signage or information relevant to the passenger (e.g., signage inside and/or outside; emergency alerts and directions).

Exemplary User Interactions with the Interactive Display Surfaces

User Case 1—Bedside Table Integration

A bedside table having an interactive display surface integrated therein may allow the user to glide a hand over the table, which may then display a desired wakeup time. This time may be accepted or changed, such as by moving a finger in a clockwise or counterclockwise circle on the tabletop, gradually increasing or decreasing the time, respectively. The user may place a phone on the table, wherein a subtle ring of light glows briefly on the tabletop, surrounding her phone, indicating that it is connected, and charging wirelessly. Through additional data interaction between the table and the phone may cause the phone to automatically turn on "do not disturb" mode, e.g., as it senses contact with the table. An additional or different hand motion over the edge of the table may then shut off the light, i.e., a separate light connected via the internet or the light provided by the interactive display surface.

The interactive display surfaces on the table may also provide sounds, such as white noise, the sound of a resting heartbeat or one of a dozen soothing sounds or music with 60 bpm, simulating the resting heartbeat, and activating the parasympathetic nervous system. Moreover, the interactive display surface may display a soothing depleted blue spectrum light that may help to disrupt the effects of blue light, such as from computer screens and other standard electronic device screen. This light and/or the sounds may be programmed to dim after one or more time intervals.

When integrated with other devices, table comprising interactive display surface may interface with smart-home devices to regulate room temperature during set hours, e.g., to 60-67 degrees Fahrenheit.

At the set wake time, alarm setting, the interactive display surface may gradually light the room with a blue light that alerts and stimulates the brain, progressively waking the user. Alternatively, or additionally, the interactive display surface may pulse the light and start sounds or music, such as after the light has reached a certain brightness level.

The interactive display surface may also display information such as the time, date, room temperature, weather, the day's schedule, alerts and/or news events, etc.

The described embodiment of the interactive display surface may (1) help stimulate the parasympathetic nervous system, (2) provide a progressive awakening function, (3) provide weather information at a glance, (4) allow control of household environmental controls or music player controls (though Homekit®, nest, or Sonos® API integration), all while functioning as a table having a beautiful surface, such as a wood veneer.

User Case 2—Coffee Table Integration

A coffee table having an interactive display surface integrated therein may allow the user to tap, slide, or hold a fingertip against the tabletop in various locations to cause rippling color effects to move, grow, and shift from within the table's surface. The interactive display surface may remember the last sequence performed, allowing the user to create a visual pattern that may be continually produced as an ambient display on the table surface. Such a visual pattern may also be created based on a music beat, key, scale, or pattern.

The interactive display surface may also display a range of functionalities. For example, should the user desire to play an interactive game, they may swipe a hand across the interactive display surface to display several different modes, wherein a game mode may be selected with a contact point on the graphic (e.g., touch the desired option). Other functionality may include control of lighting, music volume, room temperature, etc., such as through integration of the surface with Homekit®, nest, or Sonos®.

While most of the embodiments discussed thus far have been personal or residential in nature, it will be obvious to one skilled in the art that the present invention has limitless applications in commercial and business environments as well. In fact, the interactive display surfaces can be incorporated into almost any environment imaginable where a touch screen device would be of use. The interactive display surfaces can be incorporated into retail display furniture and signage to enable interested consumers into obtaining more information on an item without cluttering the environment with information that might not be necessary for all consumers. The interactive display surfaces can be used on hanging panels, cabinet doors, residential and commercial doors, appliances, etc. In any environment to provide a touch screen that blends esthetically with its environment and provides information and ambient lighting on demand instead of continuously without necessitating the use of a glass touch screen surface.

What is claimed is:

1. An interactive display device having a frameless outer perimeter, a top surface, and a bottom surface, the device comprising:
   a non-transparent surface layer;
   a touch sensor layer arranged beneath the non-transparent surface layer;
   a light layer comprising a plurality of light elements that extend to the outer perimeter of the interactive display device and are configured to render digital information;
   a substantially transparent insulation layer arranged between the touch sensor and light layers, wherein the insulation layer is a solid layer having no apertures;
   a microcontroller having a processor configured to execute computer-executable instructions, a memory storing the computer-executable instructions, and a wireless transceiver circuit in communication with the processor; and
   a support layer arranged beneath the light layer and forming the bottom surface of the device, the support layer providing rigidity to the device and supporting the microcontroller thereon,
   wherein the light layer is not visible beneath the non-transparent surface layer when the light layer is inactive, and
   wherein the touch sensor layer comprises a conductive material sandwiched between a top surface of the insulation layer and a bottom surface of the non-transparent surface layer.

2. The device of claim 1, wherein the support layer comprises a recess configured to accommodate the microcontroller.

3. The device of claim 1, wherein the processor of the microcontroller is configured to receive signals related to a touch position on the top surface of the device and generate responsive output signals corresponding to the digital information to be rendered on the light layer.

4. The device of claim 3, wherein the wireless transceiver circuit is for receiving and transmitting wireless communication signals via a wireless network, wherein the wireless communication signals comprise the digital information to be rendered on the light layer.

5. The device of claim 1, wherein the plurality of light elements are arranged in a grid and are selected from the group consisting of LED, OLED, and fiber optic lighting.

6. The device of claim 5, wherein each of the plurality of light elements is independently powered.

7. The device of claim 6, wherein each of the plurality of light elements is a red-green-blue light emitting diode (RGB LED) or red-green-blue-white light emitting diode (RGBW LED).

8. The device of claim 1, wherein the non-transparent surface layer comprises a material selected from the group consisting of wood, fiber, stone, leather, Corian®, Quartz®, polymers, ceramics, alloys, vinyl, opaque acrylics, plastics, and composite materials.

9. The device of claim 1, wherein the touch sensor layer comprises:
   a capacitive touch sensor configured to generate an input signal related to a touch position on the touch sensor layer; and
   an electronic input-output control system configured to receive the input signal and generate a responsive output signal receivable by the processor.

10. The device of claim 9, wherein the capacitive touch sensor layer comprises:
    a plurality of electrodes electrically coupled to the conductive material and spaced apart at predetermined intervals,
    wherein the conductive material comprises at least one of metal nanowires or traces arranged in an x-y grid.

11. The device of claim 1, wherein the insulation layer comprises a lens positioned above each of the plurality of light elements, wherein the lenses are formed as recesses or protrusions in the insulation layer and focus or diffuse light from the light elements.

12. The device of claim 1, wherein the plurality of light elements are arranged in a grid having a pitch of 1 mm to 5 mm, and wherein a thickness of the insulation layer is equal to or greater than 0.5× the pitch of the grid.

13. A piece of furniture having the device of claim 1 embedded on a surface thereof, wherein the sensor layer is arranged below and bonded to a non-transparent surface veneer of the piece of furniture such that the device blends with the surface when the light layer is inactive.

14. A wall, floor, or door having the device of claim 1 embedded therein, wherein the sensor layer is arranged below and bonded to a non-transparent surface constituting at least a portion of the wall, floor, or door such that the device blends with the surface when the light layer is inactive.

15. A method for providing digital information on a non-transparent surface, the method comprising:
    positioning an interactive display device below the non-transparent surface, the interactive display having a frameless outer perimeter and comprising:
      a substantially transparent insulation layer having no apertures,
      a touch sensor layer comprising a conductive material sandwiched between a top surface of the insulation layer and a bottom surface of the non-transparent surface layer, a light layer comprising a plurality of light elements that extend to the outer perimeter of the interactive display device and are configured to render the digital information, the light layer arranged directly below the insulation layer, a microcontroller having a processor configured to execute computer-executable instructions, a memory storing the computer-executable instructions, and a wireless transceiver circuit in communication with the processor, and a support layer arranged beneath the light layer and forming a bottom surface of the device, the support layer providing rigidity to the device and comprising a recess configured to accommodate the microcontroller, providing the digital information responsive to a touch contact on the non-transparent surface at a position over the touch sensor layer of the device, wherein the processor of the microcontroller is configured to receive signals related to the position and generate responsive output signals corresponding to the digital information to be rendered on the light layer.

16. The method of claim 15, wherein the wireless transceiver circuit is for receiving and transmitting wireless communication signals via a wireless network, wherein the wireless communication signals comprise the digital information to be rendered on the light layer.

17. The method of claim 15, wherein the digital information is any of an image, a text, a light, a pattern, or a combination thereof.

18. The method of claim 15, wherein the non-transparent surface is part of a piece of furniture, a wall, a floor, a door, a motor vehicle, a transit vehicle, or a decorative element.

19. The method of claim 15, wherein the non-transparent surface comprises a material selected from the group consisting of wood, fiber, stone, leather, Corian®, Quartz®, polymers, ceramics, alloys, vinyl, opaque acrylics, plastics, and composite materials.

* * * * *